(12) United States Patent
Yamazaki et al.

(10) Patent No.: US 6,370,103 B1
(45) Date of Patent: Apr. 9, 2002

(54) OBJECTIVE LENS FOR CORRECTING CHROMATIC ABERRATION FOR USE IN RECORDING TO OR REPRODUCING FROM OPTICAL INFORMATION RECORDING MEDIUM AND OPTICAL PICKUP APPARATUS THEREWITH

(75) Inventors: Hiroyuki Yamazaki; Toshiyuki Kojima, both of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/461,239

(22) Filed: Dec. 16, 1999

(30) Foreign Application Priority Data

Dec. 17, 1998 (JP) ............................................ 10-358979
Jan. 14, 1999 (JP) ........................................... 11-007417

(51) Int. Cl.$^7$ ................................................. G11B 7/00
(52) U.S. Cl. ............................ 369/112.26; 369/112.08; 369/94
(58) Field of Search ................................ 369/44.23, 94, 369/112.07, 112.08, 112.12, 112.13, 112.26

(56) References Cited

U.S. PATENT DOCUMENTS

| | | | | |
|---|---|---|---|---|
| 5,708,641 A | * | 1/1998 | Choi et al. | 369/112.07 |
| 5,870,369 A | * | 2/1999 | Chung et al. | 369/112.26 |
| 5,930,214 A | * | 7/1999 | Kasahara et al. | 369/112.24 |
| 5,978,346 A | * | 11/1999 | Mizuno et al. | 369/94 |
| 6,061,324 A | * | 5/2000 | Arai et al. | 369/112.26 |
| 6,088,322 A | * | 7/2000 | Broome et al. | 369/112.26 |
| 6,091,691 A | * | 7/2000 | Yoo et al. | 369/112.26 |
| 6,192,021 B1 | * | 2/2001 | Saito et al. | 369/112.26 |
| 6,285,646 B1 | * | 9/2001 | Yoo et al. | 369/112.26 |

FOREIGN PATENT DOCUMENTS

| | | | |
|---|---|---|---|
| JP | 7-57271 | * | 3/1995 |
| JP | 7-302437 | * | 11/1995 |
| JP | 8-55363 | * | 2/1996 |
| JP | 9-17023 | * | 1/1997 |
| JP | 9-194975 | * | 7/1997 |
| JP | 10-69675 | * | 3/1998 |
| JP | 11-96585 | * | 4/1999 |

* cited by examiner

Primary Examiner—Thang V. Tran
(74) Attorney, Agent, or Firm—Finnegan, Henderson, Farabow, Garrett & Dunner, L.L.P.

(57) ABSTRACT

An optical pickup apparatus for reproducing information from one of different kinds of optical information recording medium, each having a transparent substrate in different thickness, or for recording information onto one of the different kinds of optical information recording medium, the optical pickup apparatus includes: a light source for emitting light flux; a converging optical system having an optical axis, a ring-zonal diffraction section, and a refracting surface including a first divisional portion, a second divisional portion and a third divisional portion. The third divisional portion is farther from the optical axis than the first divisional portion, and the second divisional portion is provided between the first divisional portion and the third divisional portion. The optical pickup apparatus further includes an image sensor, wherein the first divisional portion and the third divisional portion are capable of converging the light flux on a first information recording plane of a first optical information recording medium having a first transparent substrate of thickness t1, to reproduce information recorded in the first optical information recording medium. The first divisional portion and the second divisional portion are capable of converging the light flux on a second information recording plane of a second optical information recording medium having a second transparent substrate of thickness t2, to reproduce information recorded in the second optical information recording medium, wherein t2 is greater than t1. The image sensor is capable of receiving light flux reflected from the first information recording plane or the second information recording plane.

24 Claims, 11 Drawing Sheets

FIG. 7 (a)
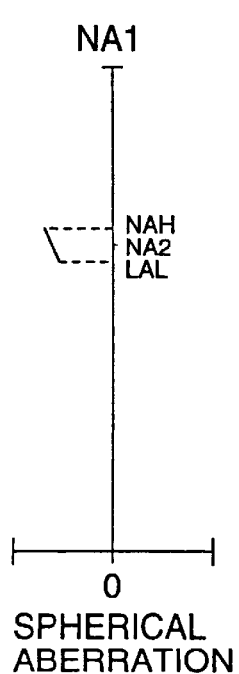
FIG. 7 (b)
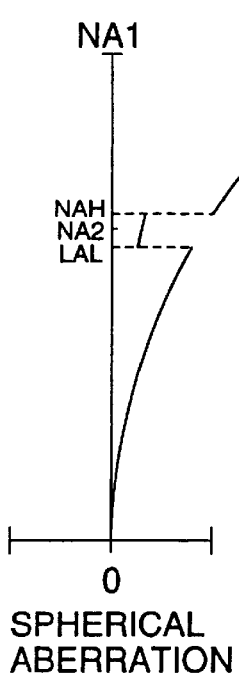
FIG. 7 (c)
FIG. 7 (d)
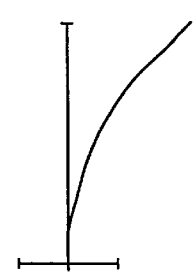
FIG. 7 (e)
FIG. 7 (f)

OBJECTIVE LENS FOR CORRECTING CHROMATIC ABERRATION FOR USE IN RECORDING TO OR REPRODUCING FROM OPTICAL INFORMATION RECORDING MEDIUM AND OPTICAL PICKUP APPARATUS THEREWITH

BACKGROUND OF THE INVENTION

This invention relates to a recording/reproducing method of optical information, wherein a light flux emitted from a light source is converged on an information recording plane and optical information to be reproduced is recorded on an optical information recording medium, or information on the information recording plane is reproduced, to an optical pickup apparatus, to a converging optical system, an objective lens to be used therefor, and to a recording/reproducing apparatus for optical information recording medium.

In recent years, with the practical use of a red semiconductor laser of a short wavelength, development of a DVD (digital video disk or called also a digital versatile disk), which is a high-density optical information recording medium having a larger capacity but a size of the same degree as a CD (compact disk) which is a conventional optical information recording medium (also called an optical disk), has been promoted. In this DVD, the numerical aperture NA of the objective lens at the side of the optical disk is made to be 0.6 in the case where a short wavelength semiconductor laser of 635 nm is used. Further, a DVD has a track pitch of 0.74 μm and a minimum pit length of 0.4 μm, and is made to have a high density more than twice in comparison with a CD, which has a track pitch of 1.6 μm and a minimum pit length of 0.83 μm. Moreover, in addition to the above-mentioned CD and DVD, optical disks having various standards, for instance, such as a CD-R (a direct read after write, writing once compact disk), a CD-RW, an LD, an MD (mini-disk), a DVD-RAM and an MO (magneto-optic disk) are merchandised and have come into general use. In Table 1, the thickness of the transparent substrate and the required numerical aperture of various optical disks are shown.

TABLE 1

| Optical disk | Thickness of transparent substrate (mm) | Required numerical aperture NA (wavelength of light source_nm) |
|---|---|---|
| CD, CD-R (reproducing only) | 1.20 | 0.45 (1 = 780) |
| CD-R (recording, reproducing) | 1.20 | 0.50 (1 = 780) |
| LD | 1.20 | 0.50 (1 = 780) |
| MD | 1.20 | 0.45 (1 = 780) |
| MO (ISO 3.5 inch 230 MB) | 1.20 | 0.55 (1 = 780) |
| MO (ISO 3.5 inch 640 MB) | 1.20 | 0.55 (1 = 680) |
| DVD | 0.60 | 0.60 (1 = 635) |

Besides, with regard to the CD-R, it is necessary for the light source to have a wavelength λ=780 (nm), but for the other optical disks, a light source having a wavelength other than those noted in Table 1 can be used; in this case, the required numerical aperture NA should be varied in accordance with the wavelength λ of the light source used. For example, in the case of a CD, the required numerical aperture is approximated by NA=μ (μm)/1.73, and in the case of a DVD, it is approximated by NA=λ (μm)/1.06.

Further, the numerical aperture as referred to in this specification (for example, referred to as NA1, NA2, NAL, NAH, NA3, NA4, etc. hereinafter) means the numerical aperture of the converging optical system as seen from the transparent substrate side. NA1 is a numeral aperture necessary for reproducing information from or recording information in the first optical information recording medium and NA2 is a numeral aperture necessary for reproducing information from or recording information in the second optical information recording medium.

As described in the above, it is now an age when various kinds of optical disks, which are different in the size, the thickness of the transparent substrate, the recording density, the wavelength used, and so forth, are available on the market, and optical pickup apparatus capable of being used for various kinds of optical disks are proposed.

As one of them, it has been proposed an optical pickup apparatus which is equipped with converging optical systems corresponding to the different optical disks respectively, and the converging optical systems are switched over in accordance with the optical disk to be reproduced. However, in this optical pickup apparatus, a plurality of converging optical systems is required and it brings not only a high cost but also the necessity of a driving mechanism for switching over the converging optical systems; accordingly, the device is not desirable because of the complexity and the requirement of the precision in switching over.

Therefore, various kinds of optical pickup apparatus which can reproduce a plurality of optical disks by using a single converging optical system.

Incidentally, in this specification, the phrase 'to reproduce an optical disk', 'to record an optical disk' or the like is used in the sense 'to reproduce information in an optical disk, 'to record information in an optical disk', or the like for simplicity's sake.

As one of them, in Japanese laid open patent H7-302437, an optical pickup apparatus, wherein the refracting surface of the objective lens is divided into a plurality of ring-shaped domain, and each of the divisional surface domains makes the beam converge on one of the optical disks having different thickness to reproduce information, is described.

Besides, in Japanese laid open patent H7-57271, an optical pickup apparatus, wherein, in the case of the first optical disk with the thickness of the transparent substrate t1, an objective lens designed to make the wave front aberration included in the converged beam not larger than 0.07λ is employed, and in the case of the second optical disk having the thickness of the transparent substrate t2, the converged beam spot is formed in a little defocused state, is described.

However, in the optical pickup apparatus described in Japanese laid open patent H7-302437, it is necessary to make the laser output large because the incident light quantity is simultaneously divided into two focal points by a single objective lens, which brings about high cost. Further, in the optical pickup apparatus described in Japanese laid open patent H7-57271, increasing of jitter owing to side lobe occurs when the reproduction of the second disk is carried out. In particular, because the second disk is subjected to reproduction forcibly by the objective lens which makes the wave front aberration not larger than 0.07λ for the first optical disk, there is a limit in the numerical aperture capable of reproducing the second optical disk.

With the background stated above, there are given methods proposed to solve the above-mentioned problems, which are disclosed in Japanese TOKKAIHEI Nos. 8-55363, 9-17023, 9-194975, 10-69675 and 11-96585.

However, when recording information on an optical information recording medium, another problem is further caused. In general, greater laser power is required for recording on an optical information recording medium than for reproducing, and this difference of power changes a wavelength of a light source (which is also called wavelength shift or wavelength drift), thus, chromatic aberration based on the wavelength change is caused. When chromatic aberration of an optical system is not corrected, a light converging position is changed by the wavelength shift, and a focal point is shifted, resulting in possibility of occurrence of an error in recording and/or reproducing of information.

For solving problems caused by wavelength changes, there have been proposed various optical systems each having a function of correcting chromatic aberration. However, none of them is one wherein reproducing/recording of plural optical information recording media can be conducted by one converging optical system.

In other words, in the prior art, it has been impossible to obtain an objective lens, an optical pickup apparatus and an optical information recording/reproducing apparatus wherein one converging optical system (with one or plural light sources) can cope with recording/reproducing of various optical disks each having different size, board thickness, recording density and wavelength to be used, a problem of chromatic aberration caused by wavelength shift derived from change of power in recording is solved, and thereby, recording/reproducing can be conducted satisfactorily.

SUMMARY OF INVENTION

An object of the invention is to solve the problems stated above and to provide an objective lens, an optical pickup apparatus and an optical information recording/reproducing apparatus wherein one converging optical system (with one or plural light sources) can cope with recording/reproducing of various optical disks each having different size, board thickness, recording density and wavelength to be used, a problem of chromatic aberration caused by wavelength shift derived from change of power in recording is solved, and thereby, recording/reproducing can be conducted satisfactorily.

The above-mentioned objects can be attained by either one of the following structures.

Structure 1

An optical pickup apparatus for reproducing information from one of different kinds of optical information recording medium, each having a transparent substrate in different thickness, or for recording information onto one of said different kinds of optical information recording medium, comprising: a light source for emitting light flux; a converging optical system having an optical axis, a ring-zonal diffraction section, and a refracting surface including a first portion, a second portion and a third portion, wherein the third portion is farther from the optical axis than the first portion, and the second portion is provided between the first portion and the third portion; and an image sensor, wherein the first portion and the third portion are capable of converging the light flux on a first information recording plane of a first optical information recording medium having a first transparent substrate of thickness t1, to reproduce information recorded in the first optical information recording medium, wherein the first portion and the second portion are capable of converging the light flux on a second information recording plane of a second optical information recording medium having a second transparent substrate of thickness t2, to reproduce information recorded in the second optical information recording medium, wherein t2 is greater than t1, and wherein the image sensor is capable of receiving light flux reflected from the first information recording plane or the second information recording plane.

Structure 2

The optical pickup apparatus according to Structure 1 wherein when A represents an amount of focal point shifting caused on the above-mentioned refracting surface by a wavelength change of a light flux emitted from the light source, and B represents an amount of focal point shifting caused on the above-mentioned ring-zonal diffraction section by a wavelength change of a light flux emitted from the light source, the following conditional expression is satisfied.

$$0<=|A+B|<=|A|$$

Structure 3

The optical pickup apparatus according to Structure 2, wherein the following conditional expression is satisfied.

$$|A+B|=0$$

Structure 4

The optical pickup apparatus according to Structure 2, wherein the wavelength of a light flux emitted from the light source is changed based on the change in an amount of electric current supplied to the light source.

Structure 5

The optical pickup apparatus according to Structure 2, wherein the optical pickup apparatus has therein the aforesaid light source (first light source) and a second light source which emits a light flux whose wavelength is longer than that emitted from the first light source, and the conditional expression above is satisfied for the light flux emitted from the first light source.

Structure 6

The optical pickup apparatus according to Structure 1, wherein the converging optical system has an objective lens which further has therein the optical axis, the refracting surface (including the first divisional portion, the second divisional portion and the third divisional portion) and the ring-zonal diffraction section, and the ring-zonal diffraction section is provided on the surface of the objective lens which is opposite to the refracting surface.

Structure 7

The optical pickup apparatus according to Structure 6, wherein the ring-zonal diffraction section is provided on the mostly entire portion of the surface which is opposite to the refracting surface.

Structure 8

The optical pickup apparatus according to Structure 1, wherein the converging optical system has an objective lens which further has therein the optical axis, the refracting surface (including the first divisional portion, the second divisional portion and the third divisional portion) and the ring-zonal diffraction section, and the ring-zonal diffraction section is provided on the refracting surface.

Structure 9

The optical pickup apparatus according to Structure 8, wherein the ring-zonal diffraction section is provided also on each of the first divisional portion, the second divisional portion and the third divisional portion of the refracting surface.

Structure 10

The optical pickup apparatus according to Structure 1, wherein the converging optical system has an objective lens which further has therein the optical axis and the refracting surface (including the first divisional portion, the second divisional portion and the third divisional portion), and the ring-zonal diffraction section is provided on an optical member which is different from the objective lens.

Structure 11

The optical pickup apparatus according to Structure 2, wherein an amount of change in wavelength of a light flux emitted from the light source is ±20 nm or less.

Structure 12

An objective lens having an aspherical face for use in an optical pickup apparatus for reproducing information from one of different kinds of optical information recording medium, each having a transparent substrate in different thickness, or for recording information onto one of said different kinds of optical information recording medium, lens comprising: a ring-zonal diffraction section; and an optical surface having a first divided surface, a second divided surface, and a third divided surface, wherein the third divided surface is farther from the optical axis than the first divided surface, the second divided surface is provided between the first divided surface and the third divided surface, wherein the objective lens is capable of converging a first light flux which passes through the first divided surface and a third light flux which passes through the third divided surface on a first information recording plane of a first optical information recording medium through a first transparent substrate of the first optical information recording medium, to reproduce information recorded in the first optical information recording medium, the thickness of the first transparent substrate is t1, and wherein the objective lens is capable of converging the first light flux and a second light flux which passes through the second divided surface on a second information recording plane of a second optical information recording medium through a second transparent substrate of the second optical information recording medium, to reproduce information recorded in the second optical information recording medium, the thickness of the first transparent substrate is t2 which is greater than t1.

Structure 13

The objective lens according to Structure 12 wherein the ring-zonal diffraction section is provided on the surface which is different from the refracting surface.

Structure 14

The objective lens according to Structure 12 wherein the ring-zonal diffraction section is provided on the mostly entire portion of the surface which is different from the refracting surface.

Structure 15

The objective lens according to Structure 12 wherein the ring-zonal diffraction section is provided on the refracting surface.

Structure 16

The objective lens according to Structure 12 wherein the ring-zonal diffraction section is provided also on each of the first divisional portion, the second divisional portion and the third divisional portion of the refracting surface.

Structure 17

The objective lens according to Structure 12 wherein when A represents an amount of focal point shifting caused on the above-mentioned refracting surface by a wavelength change of a light flux emitted from the light source, and B represents an amount of focal point shifting caused on the above-mentioned ring-zonal diffraction section by a wavelength change of a light flux emitted from the light source, the following conditional expression is satisfied.

$$0<=|A+B|<=|A|$$

Structure 18

The objective lens according to Structure 12 wherein the following conditional expression is satisfied.

$$|A+B|=0$$

Structure 19

An optical information recording medium reproducing or recording apparatus for reproducing information from one of different kinds of optical information recording medium, each having a transparent substrate in different thickness, or for recording information onto one of said different kinds of optical information recording medium, said optical information recording medium reproducing or recording apparatus comprising: an optical pickup apparatus comprising: a light source for emitting light flux; a converging optical system having an optical axis, a ring-zonal diffraction section, and a refracting surface including a first portion, a second portion and a third portion, wherein the third portion is farther from the optical axis than the first portion, and the second portion is provided between the first portion and the third portion; and an image sensor, wherein the first portion and the third portion are capable of converging the light flux on a first information recording plane of a first optical information recording medium having a first transparent substrate of thickness t1, to reproduce information recorded in the first optical information recording medium, wherein the first portion and the second portion are capable of converging the light flux on a second information recording plane of a second optical information recording medium having a second transparent substrate of thickness t2, to reproduce information recorded in the second optical information recording medium, wherein t2 is greater than t1, and wherein the image sensor is capable of receiving light flux reflected from the first information recording plane or the second information recording plane.

Structure 20

The optical information recording medium recording/ reproducing apparatus according to Structure 19, wherein when A represents an amount of focal point shifting caused on the above-mentioned refracting surface by a wavelength change of a light flux emitted from the light source, and B represents an amount of focal point shifting caused on the above-mentioned ring-zonal diffraction section by a wave length change of a light flux emitted from the light source, the following conditional expression is satisfied.

$$0 <= |A+B| <= |A|$$

Structure 21

The optical information recording medium recording/reproducing apparatus according to Structure 20 wherein the following conditional expression is satisfied.

$$|A+B|=0$$

Structure 22

The optical information recording medium recording/reproducing apparatus according to Structure 19, wherein the converging optical system has an objective lens which further has therein the optical axis, the refracting surface (including the first divisional portion, the second divisional portion and the third divisional portion) and the ring-zonal diffraction section, and the ring-zonal diffraction section is provided on the surface of the objective lens which is opposite to the refracting surface.

Structure 23

The optical information recording medium recording/reproducing apparatus according to Structure 19, wherein the converging optical system has an objective lens which further has therein the optical axis, the refracting surface (including the first divisional portion, the second divisional portion and the third divisional portion) and the ring-zonal diffraction section, and the ring-zonal diffraction section is provided on the refracting surface.

Structure 24

The optical information recording medium recording/reproducing apparatus according to Structure 19, wherein the converging optical system has an objective lens which further has therein the optical axis and the refracting surface (including the first divisional portion, the second divisional portion and the third divisional portion), and the ring-zonal diffraction section is provided on an optical member which is different from the objective lens.

Structure 25

A chromatic-aberration-corrected objective lens for recording and/or reproducing representing an optical system for an optical pickup apparatus which converges a light flux emitted from a light source on an information recording surface with one converging optical system through a transparent substrate, for recording information on and/or reproducing information from the information recording surface, wherein at least one optical surface constituting the converging optical system is made to be a refracting surface which is divided into plural ring zones which are coaxial with the optical surface, and a diffraction ring-zonal lens is provided on at least one other optical surface, to offset chromatic aberration caused on the refracting surface by a wavelength difference by chromatic aberration caused by the diffraction ring-zonal lens.

Structure 26

The chromatic-aberration-corrected objective lens for recording and/or reproducing according to Structure 25 wherein, in the optical system for an optical pickup apparatus in which light fluxes emitted from light sources each being different in terms of wavelength are converged on information recording surfaces by one converging optical system through transparent substrates for recording and/or reproducing information on the information recording surfaces, for the first optical information recording medium having a t1 thick transparent substrate and the second optical information recording medium having a t2 (t2≠t1) thick transparent substrate, at least one optical surface constituting the converging optical system is made to be one which is divided into the first divisional portion located in the vicinity of an optical axis positioned at the center of the optical surface, the third divisional portion and the second divisional portion which is sandwiched between the first and third divisional portions, a beam spot is formed by light fluxes which have passed through the first and third divisional portions, for recording and/or reproducing of the first optical information recording medium having a t1 thick transparent substrate, a beam spot is formed by light fluxes which have passed through the first and second divisional portions, for recording and/or reproducing of the second optical information recording medium having a t2 (t2≠t1) thick transparent substrate, and chromatic aberration caused on the refracting surface and chromatic aberration caused by the diffraction ring-zonal lens both in the case of recording and/or reproducing of the first optical information recording medium having a t1 thick transparent substrate, are made to offset each other.

BRIEF DESCRIPTION OF THE DRAWINGS

FIGS. 7(a) to 7(f) are diagrams showing spherical aberration of an objective lens.

DETAILED DESCRIPTION OF THE PREFERRED EMBODIMENT

Figure 1:
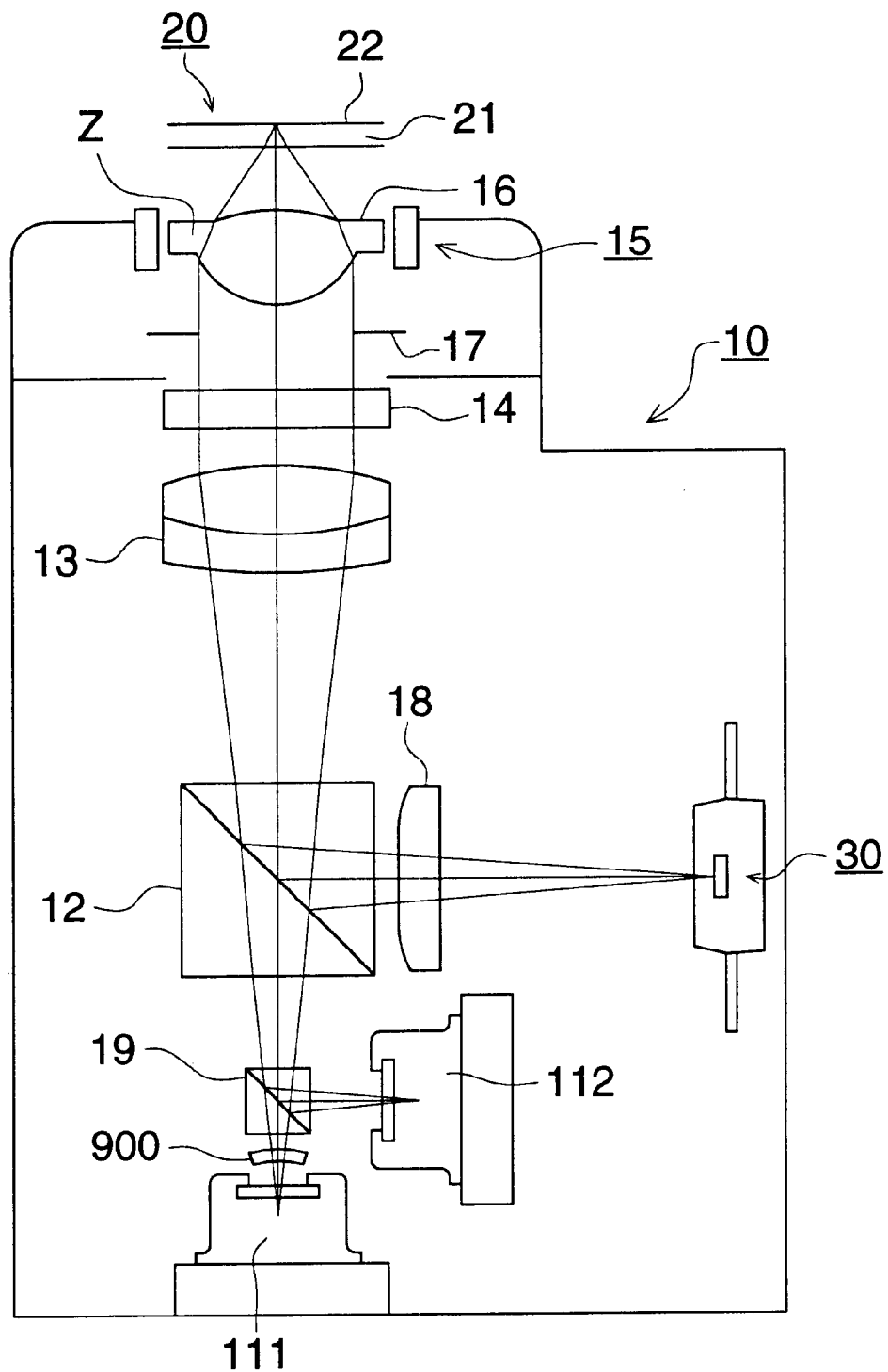
FIG. 1 is a schematic view showing an outline of the structure of an optical pickup apparatus of this invention.

The explanation will be given with reference to FIG. 1 which is a drawing of the outline of the structure of an optical pickup of this invention. In this embodiment of the invention, the optical pickup apparatus has the first semiconductor laser 111 (wavelength λ1=610 nm–680 nm), which is the first light source for the reproduction of the first optical disk, and the second semiconductor laser 112 (wavelength λ2=740 nm–870 nm, preferably, 740 nm–810 nm), which is the second light source for the reproduction of the second optical disk. Further, the composing means 19 is a means capable of combining the light flux emitted from the first semiconductor laser 111 and the light flux emitted from the second semiconductor laser 112, and is a means for letting the both light flux come on the same optical path in order to converge them on the optical disk 20 through a single converging optical system.

First, in the case where the first optical disk (e.g. DVD) having the transparent substrate with the thickness $t_1$ is reproduced, the beam is emitted from the first semiconductor laser 111, and the emitted light flux is changed in terms of a divergence angle by lens 900 representing a means to change a divergence angle of a light flux, and is transmitted through the composing means (dichroic prism) 19, the polarizing beam splitter 12, the collimator lens 13, and the quarter-wave plate 14, and becomes a parallel light flux circularly polarized. Incidentally, the dichroic prism 19 is a composing means to make an optical axis of light emitted from the first semiconductor laser 111 to agree mostly with that of light emitted from the second semiconductor laser 112, and in the illustrated optical system, light with wavelength λ2 emitted from the second semiconductor laser 112 is reflected, while, light with wavelength λ1 emitted from the first semiconductor laser 111 is transmitted. This light flux is limited by the stop 17, and converged on the information recording plane 22 through the transparent substrate 21 of the first optical disk 20 by the objective lens 16. The stop 17 limits the light flux to the numerical aperture on the optical disk side of objective lens 16 necessary for recording and/or reproducing of the first optical disk. That is, on the information recording plane 22, a beam spot with intensity of a degree capable of recording or reproducing information is formed. Then the light flux modulated and reflected by the information pits on the information recording medium 22, transmitting again through the objective lens 16, the quarter-wave plate 14, and the collimator lens 13, enters into the polarizing beam splitter 12, is reflected here, being given astigmatism by the cylindrical lens 18, and enters onto the photo-detector 30; thus the read (reproduced) signal of the information recorded in the first optical disk 20 can be obtained by using the signal outputted from the photo-detector 30. Incidentally, the polarizing beam splitter 12 is a separating means to separate a light flux for guiding the reflected light coming from the optical disk to a photosensing means, and it is arranged between the light converging means and the dichroic prism. Further, the detection of focusing and the detection of the track are carried out by detecting the variation of the light quantity distribution based on the variation of the shape of spot on the photo-detector 30. On the basis of the above-mentioned detection, the two-dimensional actuator 15 moves the objective lens 16 in a way such that the light from the semiconductor laser 111 is converged on the information recording plane 22 of the first optical disk 20, and at the same time, it moves the objective lens 16 in a way such that the light from the semiconductor laser 111 is converged on the predetermined track. Incidentally, detection of focusing and detection of track can be conducted by various methods such as a knife edge method, an SSD method, a push-pull method and a 3-beam method.

On the other hand, in the case where the second optical disk (e.g. CD) having the transparent substrate with the thickness $t_2$ ($t_1 < t_2$) is reproduced, the beam is emitted from the first semiconductor laser 112, and the emitted light flux is subjected to the change of optical path by the composing means 19, and then is transmitted through the polarizing beam splitter 12, the collimator lens 13, the quarter-wave plate 14, the stop 17, and the objective lens and is converged on the second optical disk. Then the light flux modulated and reflected by the information pits on the information recording medium 22, being transmitted again through the objective lens 16, the quarter-wave plate 14, the collimator lens 13, the polarizing beam splitter 12, and the cylindrical lens 18, enters onto the photo-detector 30; thus the read (reproduced) signal of the information recorded in the second optical disk 20 can be obtained by using the signal outputted from the photo-detector 30. Further, the detection of focusing and the detection of the track are carried out by detecting the variation of the light quantity distribution based on the variation of the shape of the spot on the photo-detector 30. On the basis of the above-mentioned detection, the two-dimensional actuator 15 moves the objective lens 16 in a way such that the light from the semiconductor laser 112 is converged in a defocused state on the information recording plane 22 of the second optical disk 20, and at the same time, it moves the objective lens 16 in a way such that the light from the semiconductor laser 112 is converged on the predetermined track. Approximately the same operation is done when information is recorded on the first optical disk or on the second optical disk.

In the optical pickup apparatus 10 as mentioned in the above, when the first optical disk having the transparent substrate with the thickness $t_1$, for example a DVD ($t_1$=0.6 mm, the refractive index of transparent substrate=1.58), is reproduced, the objective lens 16 is driven by the two-dimensional actuator 15 in such a way as to form the minimum circle of confusion (best focusing). When the second optical disk having the substrate with the thickness $t_2$, which is different from $t_1$ ($t_2 > t_1$), and a recording density lower than that of the first optical disk, for example a CD ($t_2$=1.2 mm, the refractive index of transparent substrate= 1.58) is reproduced by using this objective lens 16, spherical aberration is produced owing to the difference in the thickness (larger thickness) of the transparent substrate; accordingly, at the position where the beam spot becomes the minimum circle of confusion (the rearward position farther than the near-axis image forming position), the spot size is not small enough to read (reproduce) the pits (information) of the second optical disk. However, at the forward position (forward focusing) which is nearer to the objective lens 16 than this position of the minimum circle of confusion, the size of the spot as a whole is larger than the minimum circle of confusion, but the spot is formed of a nucleus, in the central portion of which luminous flux is concentrated, and a flare portion around the nucleus, which is unnecessary light. By utilizing this nucleus for reproducing (reading) the pits (information) of the second optical disk, at the time of reproducing the second disk, the two-dimensional actuator 15 is driven in a way such that the objective lens 16 is brought into a defocused state (front focusing).

In this optical pickup apparatus, lens 900 having positive refracting power is arranged as a divergence angle changing means, so that a divergence rate of light emitted from the first semiconductor laser 111 and emerges from dichroic prism 19 and that of light emitted from the second semiconductor laser 112 and emerges from dichroic prism 19 may be mostly the same, for increasing an amount of converged light in the course of image recording.

The optical pickup apparatus of this kind is composed of a converging optical system and an image sensor, to have a distinctive feature that the structure is simple, and it can be used advantageously when adding a function for reproducing CD to an optical pickup apparatus for recording and/or reproducing of DVD.

Figure 2:
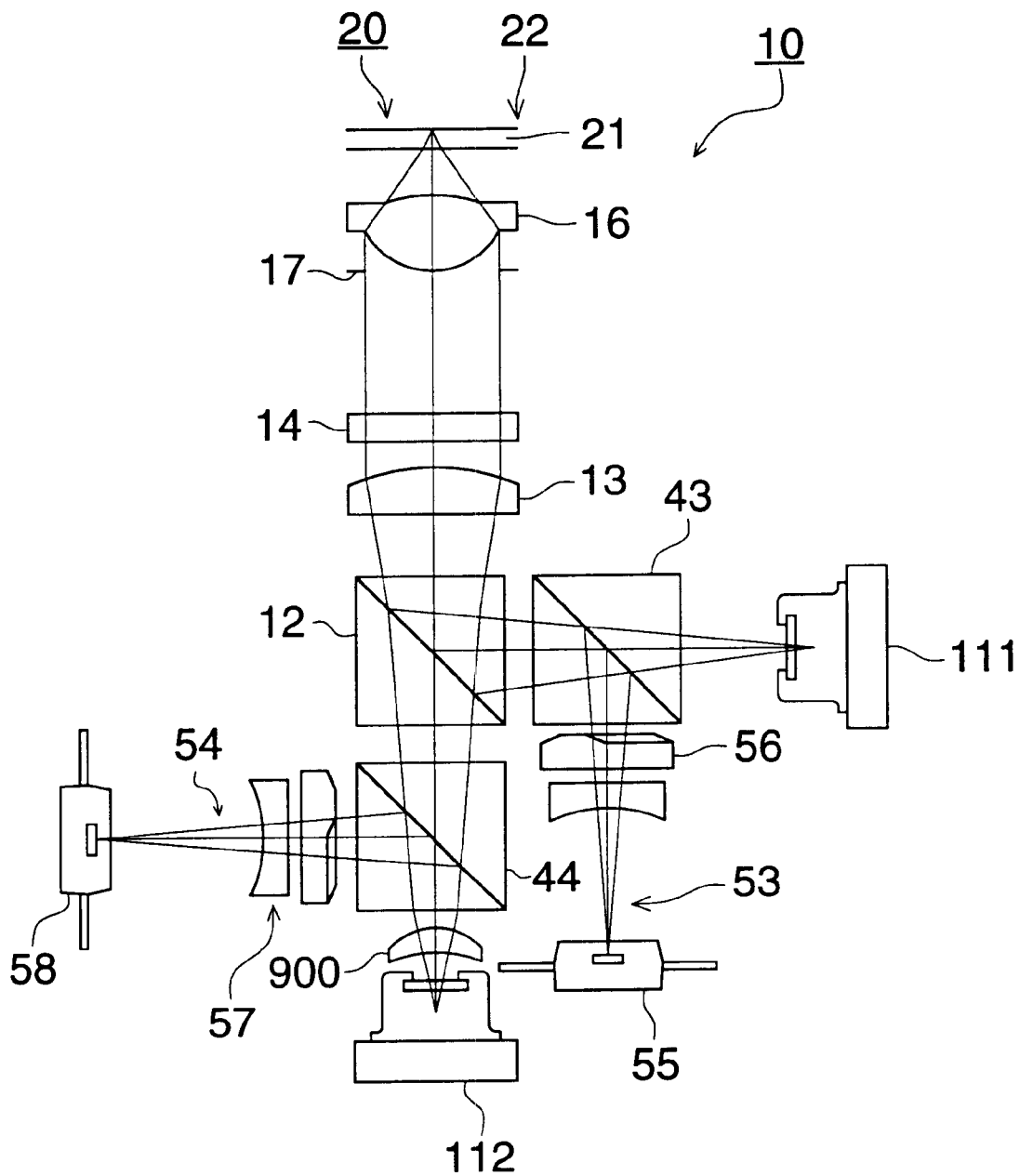
FIG. 2 shows another example of the structure of an optical pickup apparatus of this invention.

Another example of the structure of an optical pickup apparatus is shown in FIG. 2. Members in FIG. 2 having the same functions as those in the optical pickup apparatus in FIG. 1 are given the same symbols and explanation therefor will be omitted.

Different points include dichroic prism 12 representing a composing means to make an optical axis of a light flux emitted from the first semiconductor laser and that of a light flux emitted from the second semiconductor laser to agree with each other in terms of optical axis, and include that polarizing beam splitters 43 and 44 are arranged between semiconductor lasers 111 and 112 and photosensing means 53 and 54 each being suitable for each wavelength are arranged in an optical path for reflected light. Incidentally, between polarizing beam splitter 43 and photodetector 55, there is arranged cylindrical lens 56 for generating astigmatism, and between polarizing beam splitter 44 and photodetector 58, there is arranged cylindrical lens 57 for generating astigmatism.

The structure of this kind is one which is especially suitable for an optical pickup conducting recording and/or reproducing of DVD and CD, and an achromatic objective lens of the invention can be widely utilized advantageously, not only for those shown in FIG. 1 and FIG. 2 but also for known optical pickup apparatus.

An optical pickup apparatus of the invention has therein a light source, an image sensor, a converging optical system having an optical axis, a refracting surface (including the first divisional portion, the second divisional portion and the third divisional portion) and a ring-zonal diffraction section. The third divisional portion is farther than the first divisional portion from the optical axis, and the second divisional portion is located between the first divisional portion and the second divisional portion. Further, the first divisional portion and the third divisional portion can converge light on an information recording surface of the first optical information recording medium having a t1 thick transparent substrate for recording/reproducing information, while, the first divisional portion and the second divisional portion can converge light on an information recording surface of the second optical information recording medium having a t2 (t2>t1) thick transparent substrate for recording/reproducing information.

Further, it is preferable that the optical pickup apparatus of the invention satisfies the following conditional expression (A), when A represents an amount of focal point shifting caused on the refracting surface by a wavelength change of a light flux emitted from the light source, and B represents an amount of focal point shifting caused on the ring-zonal diffraction section by a wavelength change of a light flux emitted from the light source, the following conditional expression is satisfied.

$$0 <= |A+B| <= |A|  \quad (A)$$

Incidentally, the symbol of A and B is negative when the focal point is shifted toward the light source and it is positive when the focal point is shifted to the opposite side. When the conditional expression above is satisfied, better correction can be made for chromatic aberration caused by wavelength shifting, and better recording and/or reproducing of information can be conducted.

In other words, it is preferable to make chromatic aberration caused on a refracting surface by a difference of wavelength based on wavelength shifting and chromatic aberration caused on a ring-zonal diffraction section to offset each other. In putting it in another way, it is preferable to make the position of a focal point at wavelength $\lambda 1$ of a light source and the position of a focal point at wavelength $\lambda 1 \pm \alpha$ (20 nm or less is preferable for $\alpha$, 15 nm or less is more preferable, and 5 nm or less is further preferable) to be mostly the same (exactly the same is most preferable).

The further preferable is to satisfy the following conditional expression (B).

$$|A+B|=0 \quad (B)$$

When shifting of wavelength of a light flux emitted from a light source depends on the change in an amount of an electric current supplied to the light source, adjustment by the driving system of pickup is impossible because wavelength shifting is conducted at extremely high speed. Therefore, the effect of the invention can be obtained especially remarkably, which is preferable. Incidentally, when recording on an optical information recording medium, big laser power is required, and an amount of an electric current to be supplied is different accordingly. Therefore, wavelength shifting is caused by a difference of the power based on a difference of the amount of an electric current. For example, when a recording is started or a power of light flux for recording on the basis of information to be recorded is changed, the wavelength shifting tends to be carried out at a high speed. Further, it is preferable that a wavelength change (wavelength shifting) of a light flux emitted from a light source is ±20 nm or less, more preferable is ±15 nm or less, and further preferable is ±5 nm or less.

The invention can also be applied either when the optical pickup apparatus has only one light source or when the optical pickup apparatus has two or more light sources. When the optical pickup apparatus has the first light source and the second light source which emits a light flux whose wavelength is longer than that for the first light source, it is preferable that chromatic aberration is corrected (the conditional expression (A) stated above is satisfied) only for the light flux emitted from the first light source. However, it is also possible to correct chromatic aberration for wavelength shifting of both light sources. With regard to a wavelength of a light source, a range of 610 nm–670 nm or 380 nm–450 nm is preferable for the first light source, while, a range of 740 nm–870 nm is preferable for the second light source.

A ring-zonal diffraction section of the invention may be provided either on an objective lens or on an optical member other than the objective lens.

When providing on the objective lens, it is preferable to provide on the objective lens having a refracting surface (including the first divisional portion, the second divisional portion and the third divisional portion). Some of the concrete examples are explained as follows, referring to FIGS. 3 and 4.

Figure 3:
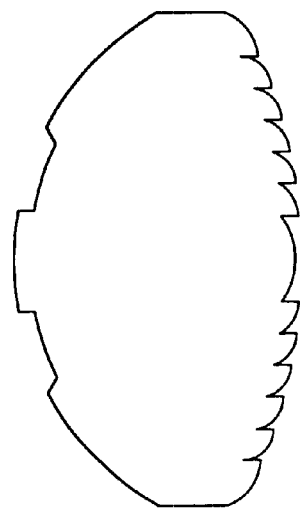
FIG. 3 shows a diagram wherein an example of providing a ring-zonal diffraction section on the surface of an objective lens opposing a refracting surface having thereon divisional portions is viewed horizontally.

FIG. 3 shows a diagram of an example viewed horizontally wherein a ring-zonal diffraction section is provided on the surface of an objective lens opposing a refracting surface having divisional portions. In this case, it is preferable that ring-zonal diffraction sections are provided on the almost entire portion of the surface opposing the refracting surface having thereon divisional portions. "Almost entire portion of the surface" preferably means "all of the portion where the light flux stopped down by the stop passes through, on at least the surface of the objective lens opposing the refracting surface having divisional portions. Or, "almost entire portion of the surface" may also mean 80% or more (preferably 90% or more) of an area of the surface opposing the refracting surface having divisional portions.

Figure 4:
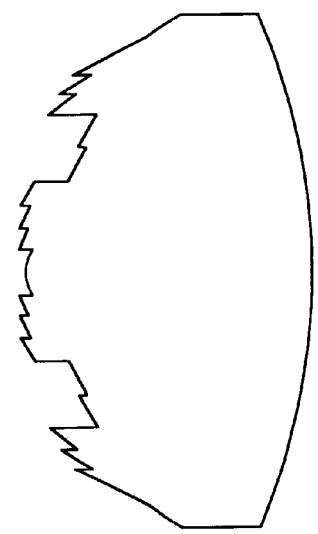
FIG. 4 is a diagram wherein an example of providing a ring-zonal diffraction section on a refracting surface of an objective lens having thereon divisional portions is viewed horizontally.

FIG. 4 shows a diagram of an example viewed horizontally wherein a ring-zonal diffraction section is provided on the refracting surface on the objective lens having divisional portions. Incidentally, it is preferable that a ring-zonal diffraction section is provided on each of the first divisional portion, the second divisional portion and the third divisional portion.

It is preferable that a protruded portion like Z on objective lens 16 in FIG. 1 is provided on the circumference of the objective lens. Due to this structure, it is possible to reduce a change in aberration such as focus shifting caused by temperature change, even when the objective lens is made of plastic.

Further, the ring-zonal diffraction section may also be provided on an optical member other than the objective lens, as stated above. For example, there is given another optical member whose only object is to provide a collimator lens or a ring-zonal diffraction section. Even when an optical member having a ring-zonal diffraction section is provided, as shown in FIGS. 1 and 2, on an optical path between objective lens 16 and optical disk 20, or even when an optical member having a ring-zonal diffraction section is provided on an optical path between light source 111 or 112 and composing means 19, or even when an optical member having a ring-zonal diffraction section is provided on an optical path between the composing means 19 and the objective lens 16, a converging optical system can be regarded to have a ring-zonal diffraction section.

Figure 5:
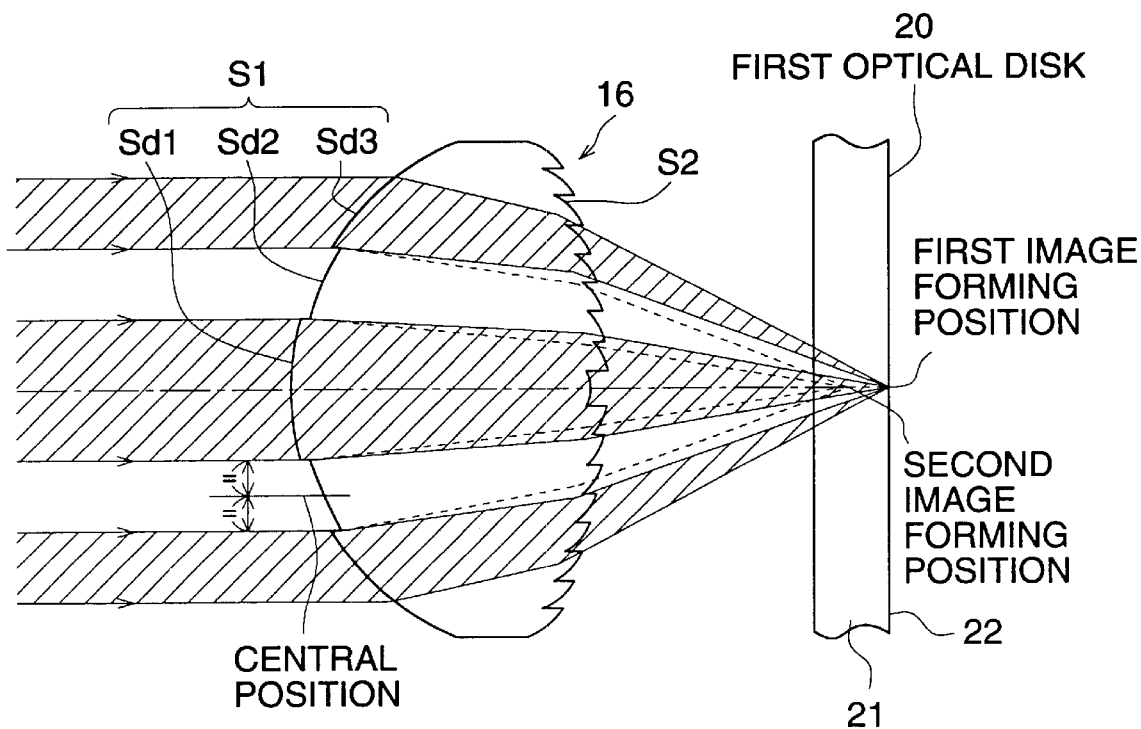
FIG. 5(a) is a cross-sectional view showing an objective lens schematically.
FIG. 5(b) is a front view of the objective lens viewing from a light source side.
Figure 5:
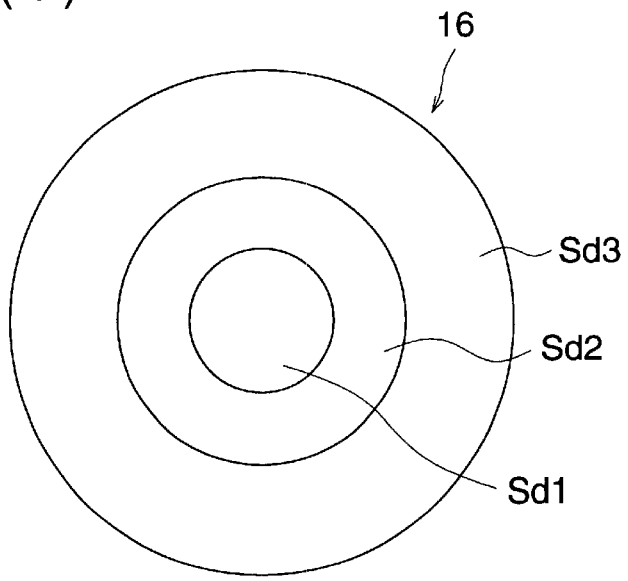

In the following, it will be explained the embodiment wherein this invention is applied to the objective lens 16, which is one optical element of the converging optical system of the optical pickup apparatus 10, in order to reproduce the first optical disk and the second optical disk, both having the substrate with different thickness, by a single converging optical system. FIG. 5(a) is a cross-sectional view showing the objective lens schematically, and FIG. 5(b) is a front view of it viewed from the light source side. In addition, the single dot and a dash line indicates the optical axis. Further, in this embodiment, the thickness of the transparent substrate of the first optical disk $t_1$ is thinner than the thickness of the transparent substrate of the second optical disk $t_2$, and information is recorded at higher density in the first optical disk than in the second optical disk.

In this embodiment of the invention, the objective lens 16 is a convex lens having the refracting surface facing toward the light source S1 and the refracting surface facing toward the optical disk S2, both of which have a shape of an aspherical face and a positive refracting power. Further, the refracting surface of the objective lens 16 facing toward the light source S1 is composed of a plurality (three in this embodiment) of concentric divisional surfaces, namely, the first divisional surface Sd1—the third divisional surface Sd3. At each of the borders of the divisional surfaces Sd1–Sd3, a step is provided to form the respective divisional surfaces Sd1–Sd3. In addition, divisional portion S2 on the optical disk has on its entire surface a ring-zonal diffraction section. This objective lens 16 has a structure such that the light flux passing through the first divisional surface Sd1 including the optical axis (the first light flux) is utilized for reproducing the information recorded in the first optical disk and in the second optical disk, and the light flux passing through the second divisional surface Sd2 which is farther from the optical axis than the first divisional surface Sd1 (the second light flux) is utilized mainly for reproducing the information recorded in the second optical disk, and the light flux passing through the third divisional surface Sd3 which is farther from the optical axis than the second divisional surface Sd2 (the third light flux) is utilized mainly for reproducing the information recorded in the first optical disk.

In the above description, the word "mainly" means that, in the case of the light flux passing through the second divisional surface Sd2, the ratio of the energy of the nucleus portion at the position where the central intensity of the beam spot becomes maximum on the condition that the light flux passing through the third divisional surface Sd3 is intercepted, to the energy of the nucleus portion at the position where the central intensity of the beam spot becomes maximum on the condition that the light flux passing through the third divisional surface Sd3 is not intercepted ("nucleus energy in the light shielding state"/ "nucleus energy in the no light shielding state") falls within the range of 60% to 100%. Further, also in the case of the light flux passing through the third divisional surface Sd3, it means that the ratio of the energy of the nucleus portion in the state of light shielding to the energy of the nucleus in the state of no light shielding ("nucleus energy in the light shielding state"/"nucleus energy in the no light shielding state") falls within the range of 60% to 100%. In addition, in order to measure this energy ratio simply, in the respective cases, it is proper simply to measure the peak intensity in the beam spot Ip and the beam diameter Dp (defined by the position where the intensity becomes $e^{-2}$ to the central intensity) at the position where its central intensity becomes maximum, to obtain the product Ip×Dp for the reason that the shape of the beam is approximately constant, and to compare the results.

As described in the above, by utilizing the first light flux in the neighborhood of the optical axis of the converging optical system for the reproduction of the first disk and the second disk, the second light flux which is farther from the optical axis than the first light flux mainly for the reproduction of the second optical disk, and the third light flux which is farther from the optical axis than the second light flux mainly for the reproduction of the first optical disk, it becomes possible to reproduce a plurality (two in this embodiment) of optical disks by a single converging optical system, while the loss of the light quantity from the light source is suppressed. On top of that, most part of the third light flux is unnecessary at the time of reproducing the second optical disk in this case, but this unnecessary light is not utilized for the reproduction of the second optical disk; hence, the reproduction can be performed only by making the stop 17 be at the numerical aperture to be required for the reproduction of the first optical disk, with no means for changing the numerical aperture of the stop 17 needed.

To state it more in detail, the objective lens 16 in this embodiment converges the first light flux and the third light flux which pass through the first divisional surface Sd1 and the third divisional surface Sd3 respectively (light flux shown by the oblique lines in FIG. 5(a)) on positions which coincide or approximately coincide with each other, one of said positions being a first image forming position, and the wave front aberration (wave front aberration with the second light flux passing through the second divisional surface Sd2 excluded) is not larger than $0.07\lambda_1$ rms. Desirably, it should be not larger than $0.05\lambda_1$ rms. Here, $\lambda_1$ is the wavelength of the light source.

Further, at this time, the second light flux passing through the second divisional surface Sd2 (light flux shown by the broken lines) converges on the second image forming position which is different from the first image forming position. Supposing that the first image forming position is at zero, the objective lens side of it is negative, and its reverse side is positive, this second image forming position should be at a distance from −40 μm to −4 μm, or desirably from −27 μm to −4 μm from the first image forming position (the second image forming position is made to be closer to the objective lens than the first image forming position). Owing to this, the reproduction of the first optical disk is carried out mainly by the first light flux and the third light flux. Further, if the distance exceeds this lower limit (−40 μm), the spherical aberration is corrected in excess, and the spot shape at the time of reproducing the first optical disk becomes bad; if the distance exceeds the upper limit (−4 μm), the spot diameter and the side lobe becomes large at the time of reproducing the second optical disk. Furthermore, in this embodiment, because t1<t2 and NA1>NA2, the second image forming position is made to be at a distance from −40 μm to −4 μm, or desirably from −27 μm to −4 μm from the first image forming position; however, in the case where t1>t2 and NA1>NA2, the second image forming position should be at a distance from 4 μm to 40 μm, or desirably from 4 μm to 27 μm from the first image forming position. That is, the absolute value of the distance between the first image forming position and the second image forming position should be within the range of 4 μm to 40 μm, or desirably 4 μm to 27 μm.

Figure 6:
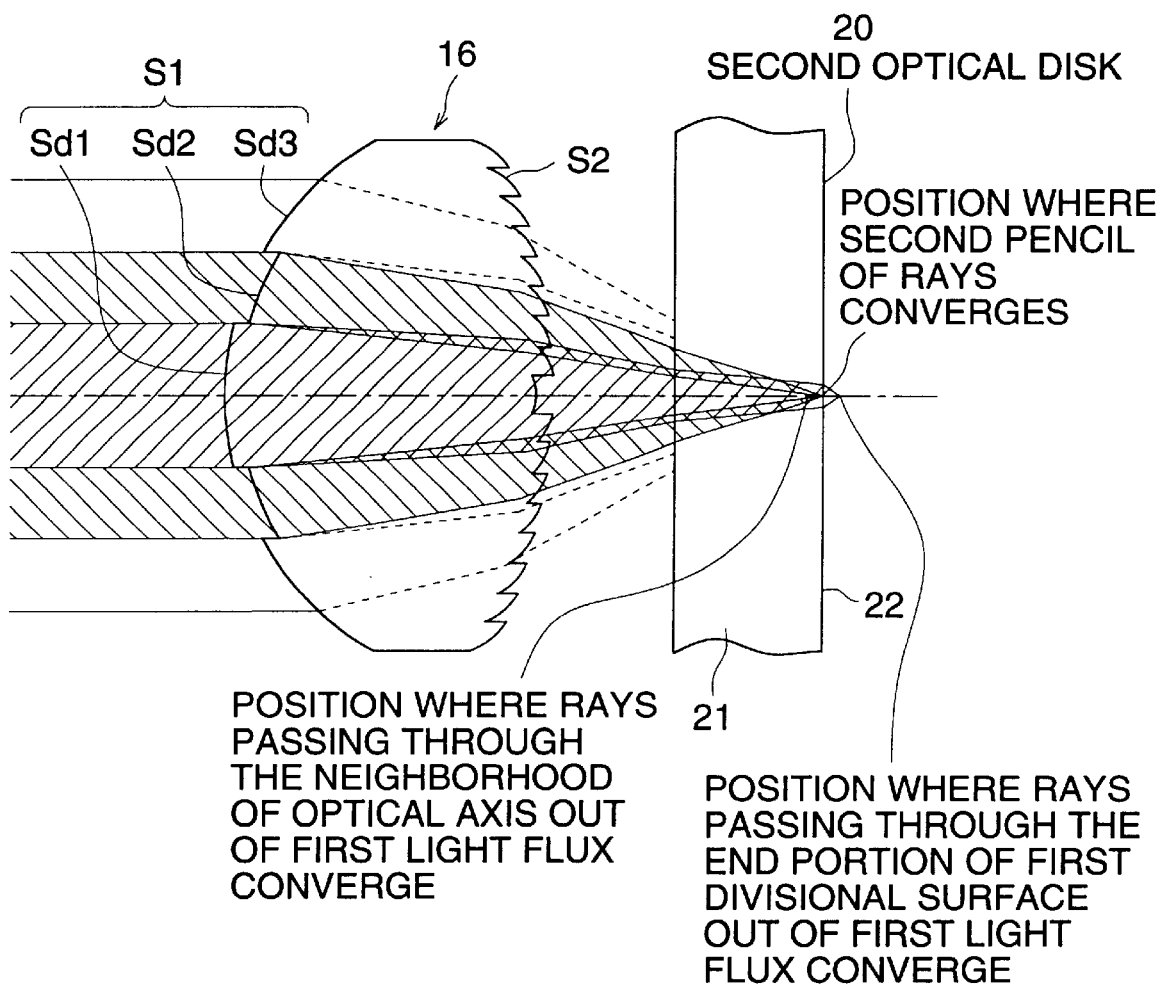
FIG. 6 is a cross-sectional view showing an objective lens schematically.

Further, when the above-mentioned objective lens 16 is used for reproduction of the second optical disk having the transparent substrate with the predetermined thickness (t2= 1.2 mm), as shown in FIG. 6, in the case of the predetermined light flux (parallel light flux) incident on the objective lens 16, the rays of the second light flux (shown by the oblique lines drawn from upper left to lower right) intersect the optical axis (forming an image) at the position between the position where the rays passing through the neighborhood of the optical axis among the first light flux (shown by the oblique lines drawn from lower left to upper right) intersect the optical axis, and the position where the rays passing through the edge portion of the first divisional surface Sd1 (border to the second divisional surface Sd2) intersect the optical axis. Therefore, the first light flux and the second light flux converge in the close vicinity of the information recording plane of the second optical disk, and the reproduction of the second optical disk is carried out. At this time, the third light flux (shown by the broken lines halfway) is generated as a flare, but the reproduction of the second optical disk is possible by the nuclei formed by the first light flux and the second light flux.

In other words, in this invention, the first light flux with small numerical aperture passing through the neighborhood of the optical axis is utilized for all the optical disks that can be reproduced; further, the light flux passing through the farther zone from the optical axis than the first divisional surface is divided in such a manner as to correspond to each of the optical disks to be reproduced, and the respective light flux formed by dividing are utilized for the reproduction of the respective optical disks (the first and second optical disks in this embodiment). At this time, the light flux utilized for the reproduction of the optical disk requiring the larger numerical aperture for the reproduction of the information recorded in the optical disk (the first optical disk in this embodiment) should be the one that is apart from the first light flux (the third light flux in this embodiment) out of the light flux formed by dividing.

By using such a converging optical system (the objective lens 16 in this embodiment), it is possible to reproduce a plurality of optical disks having the transparent substrate with different thickness by a single converging optical system; further, because the recording plane can be set arbitrarily, the numerical aperture required for the reproduction of the second optical disk NA2 can be made large. Moreover, by utilizing the light flux in the neighborhood of the optical axis (the first light flux) for the reproduction of a plurality of optical disks, the loss of light quantity of the light flux from the light source is reduced. On top of that, at the time of reproducing the second optical disk, the side lobe of the beam spot is decreased to form a nucleus with strong beam intensity; thus, a precise information can be obtained. Furthermore, a plurality of optical disks can be reproduced by a single converging optical system with no special means for changing the numerical aperture of the stop 17 required.

Further, in this embodiment, with regard to the central position of the second divisional surface Sd2 in the direction perpendicular to the optical axis (refer to FIG. 5(a)), the angle between the normal line to the second divisional surface Sd2 which is the surface from the numerical aperture NAL to the numerical aperture NAH and the optical axis should be larger than the angle between the normal line to the surface interpolated from the first divisional surface Sd1 which is the surface from the optical axis to the numerical aperture NAL and the third divisional surface Sd3 which is the surface from the numerical aperture NAH to the numerical aperture NA1 (an aspherical surface obtained from fitting by least square method using the equation of the aspherical surface expressed as the equation (1) to be described later) and the optical axis. Owing to this, it is possible to reproduce satisfactorily both of the first optical disk and the second optical disk. In addition, in this embodiment, because t2>t1 and NA1>NA2, the angle between the normal line to the second divisional surface Sd2 and the optical axis should be larger than the angle between the normal line to the surface interpolated from the first divisional surface Sd1 and the third divisional surface Sd3 and the optical axis, but in the case where t2<t1 and NA1>NA2, it is proper to make it smaller.

Further, in this embodiment of the invention, it is desirable that the first divisional surface Sd1—the third divisional surface Sd3 are determined in a manner such that, with regard to the approximately central position of the second divisional surface Sd2 in the direction perpendicular to the optical axis (refer to FIG. 5(a)), the difference between the angle made by the normal line to the second divisional surface Sd2 and the optical axis and the angle made by the normal line to the surface interpolated from the first divisional surface Sd1 and the third divisional surface Sd3 (an aspherical surface obtained from fitting by least square method using the equation of the aspherical surface expressed as the equation (1) to be described later) and the optical axis falls within the range of 0.02° to 1.0°. If the difference exceeds this lower limit, the spot shape at the time of reproducing the second optical disk becomes worse, and the side lobe spot diameter becomes larger; if the difference exceeds the upper limit, the spherical aberration is corrected in excess, and the spot shape at the time of reproducing the first optical disk becomes worse.

Further, to grasp this embodiment of the invention from another point of view, in the objective lens 16 having a plurality of divisional surfaces (three divisional surfaces in this embodiment) formed by dividing at least one of its surfaces by concentric circles with regard to the optical axis, on the condition that the light which has passed through the first divisional surface Sd1 which is nearer to the optical axis than the second divisional surface Sd2, and the light which has passed through the third divisional surface Sd3 which is positioned at the reverse side of the second divisional surface Sd2 against the optical axis are let to have approximately the same phase, through the transparent substrate with the predetermined thickness (the first optical disk), and let the phase difference between the light which has passed through the first divisional surface Sd1 and the transparent substrate and the light which has passed through the portion of the second divisional surface Sd2 which is to the optical axis side of the approximately central position of the second divisional surface Sd2 in the direction perpendicular to the optical axis (refer to FIG. 5(a)) be $(\Delta 1L)\pi$ (rad), and the phase difference between the light which has passed through the third divisional surface Sd3 and the transparent substrate and the light which has passed through the portion of the second divisional surface Sd2 which is to the reverse side of the above-mentioned central position against the optical axis and the transparent substrate be $(\Delta 1H)\pi$ (rad), then following inequality $(\Delta 1H)>(\Delta 1L)$ is established. In this case, the sign of the phase difference is let to be positive for the direction of progressing of the light (the direction to the optical disk), and the phase differences for the light which has passed through the second divisional surface Sd2 and the transparent substrate against the light which has passed through the first divisional surface Sd1 or the third divisional surface Sd3 and through the transparent substrate are compared. Further, in this embodiment, because t1<t2 and NA1>NA2, the inequality $(\Delta 1H)>(\Delta 1L)$ should be established, but in the case where t1>t2 and NA1>NA2, the inequality $(\Delta 1H)<(\Delta 1L)$ should be established; accordingly $(\Delta 1H)\neq(\Delta 1L)$.

To state this from another point of view, the difference in surface level from the third divisional surface Sd3 at the border of the third divisional surface Sd3 and the second divisional surface Sd2 is larger than the difference in surface level from the first divisional surface Sd1 at the border of the first divisional surface Sd1 and the second divisional surface Sd2 (The sign of the difference in surface level is let to be positive to the direction in which the refractive index varies from a smaller value to a larger value at the refracting surface as the border. Further, hereinafter, the sign of the difference of surface level will be determined in the same way.) In the same way as the above-described, also in this case, in the case where t1>t2 and NA1>NA2, the above-mentioned relationship is reversed, that is, the difference in surface level of the second divisional surface Sd2 from the third divisional surface Sd3 is smaller than the difference in surface level of the second divisional surface Sd2 from the first divisional surface Sd1. Further, it is desirable that, if the difference between the position of the surface interpolated from the first divisional surface and the third divisional surface and the position of the second divisional surface sd2 is taken with regard to an arbitrary position from the optical axis, it varies asymmetrically with regard to the approximately central position of the second divisional surface sd2. Furthermore, in this case, it is desirable that the difference becomes larger with the distance from the optical axis.

In addition, in this embodiment of the invention, the divisional surfaces Sd1–Sd3 are provided on the refracting surface S1 of the objective lens 16 facing the light source S1, but it is proper to provide them on the refracting surface facing toward the optical disk 20, or it may be appropriate to let any one of the optical elements of the converging optical system (such as a collimator lens 13, for example) have such a function; further, it may be proper to provide a new optical element having such a function on the optical path. Besides, it may be appropriate to provide the functions of the respective divisional surfaces Sd1–Sd3 separately in the different optical elements.

Further, in this embodiment, it is employed the objective lens which is a lens of what is called an infinite system using a collimator lens 13; however, it is possible that an objective lens into which a divergent light flux from the light source enters directly without the collimator lens 13 or through a lens reducing the degree of divergence of the divergent light flux, or an objective lens into which the convergent light flux formed by using a coupling lens which converts a light flux from the light source into a convergent light flux is employed.

Further, in this embodiment, a step portion, that is, a difference in surface level is provided between each of the borders of the first divisional surface Sd1—the third divisional surface Sd3; however, it is possible to form the divided surface with at least one of the borders formed continuously without providing the step. In other case, it is possible that the border between the divisional surfaces are joined, for example, by a surface with a predetermined radius of curvature without bending the border surface. This curvature may be the one that is provided intentionally or unintentionally. An example of this unintentionally provided curvature is the curvature at the border formed in processing the metallic mold for forming the objective lens 16 with a plastic material etc.

Further, in this embodiment, the refracting surface S1 is composed of the three divisional surfaces Sd1–Sd3, but it should be composed of at least three or more divisional surfaces, the number of divisional surfaces being not limited to three. In this case, it is desirable that the first divisional surface, which is utilized for the reproduction of the first optical disk and the second optical disk, is provided in the neighborhood of the optical axis, and regarding the divisional surfaces which are positioned at outer part (the direction farther from the optical axis) of this first divisional surface, the divisional surfaces to be utilized mainly for the reproduction of the second optical disk and the divisional surfaces to be utilized mainly for the reproduction of the first optical disk are provided alternately. Further, in this case, the divisional surfaces which are utilized mainly for the reproduction of the second optical disk should desirably be provided between the numerical aperture NA3 and the numerical aperture NA4 on the optical disk side of the objective lens 16, the apertures NA3 and NA4 satisfying the conditions 0.60(NA2)<NA3<1.3(NA2) and 0.01<NA4−NA3<0.12. Owing to this, for the second optical disk, an optical disk requiring a larger numerical aperture can be reproduced, without decreasing the intensity of the light spot to be converged on the first optical disk. Furthermore, it is desirable in practical use that the upper limit of NA3 satisfies the inequality NA3 <1.1(NA2), and it is desirable that the lower limit of NA3 satisfies the inequality 0.80(NA2)<NA3, further in practical use, 0.85(NA2)<NA3. Further, it is desirable that the upper limit of NA4−NA3 satisfies the inequality NA4−NA3<0.1.

Further, in this embodiment, on the refracting surface of the objective lens 16 facing toward the light source, the second divisional surface Sd2 is provided in a ring shape formed by concentric circles with regard to the optical axis; however, the shape is not limited to a ring, but may be a broken ring. Further, the second divisional surface Sd2 may be made up of a hologram or a Fresnel lens. In addition, in the case where the second divisional surface Sd2 is made up of a hologram, one of the light flux formed by dividing the original light flux into the zeroth order light and the first order light is utilized for the reproduction of the first optical disk and the other is utilized for the reproduction of the second optical disk. At this time, it is desirable that the light quantity of the light flux utilized for the second optical disk is larger than the light quantity of the light flux utilized for the reproduction of the first optical disk.

Further, in this embodiment, the reproduced signal from the second optical disk is made satisfactory by it that not only the condition that, when the first optical disk is reproduced (that is, when the light passes through the transparent substrate with the thickness t1), the best wave front aberration by the light flux passing through the first divisional surface Sd1 and that passing through the third divisional surface Sd3 is $0.07\lambda_1$ rms or desirably $0.05\lambda_1$ rms (where $\lambda_1$ (nm) is the wavelength of the light source used at the time of reproducing the first optical disk), but also the condition that, when the second optical disk is reproduced (that is, when the light passes through the transparent substrate with the thickness t2), the best wave front aberration by the light flux passing through the first divisional surface Sd1 is $0.07\lambda_2$ rms or desirably $0.05\lambda_2$ rms (where $\lambda_2$ (nm) is the wavelength of the light source used at the time of reproducing the second optical disk) is satisfied.

In the following, from another point of view, the explanation will be given with reference to FIGS. 7(a) to 7(f) which are drawings showing the spherical aberration of the objective lens 16. FIG. 7(a) is a drawing of the spherical aberration when the first optical disk is reproduced, that is, when reproduction is carried out through the transparent substrate with the thickness t1, and FIG. 7(b) is a drawing of the spherical aberration when the second optical disk is reproduced, that is, when the reproduction is carried out through the transparent substrate with the thickness t2 (t2>t1 in this embodiment). Now, let NA1 be the numerical aperture of the converging optical system at the optical disk side required for the reproduction of the information in the first optical disk, NA2 be the numerical aperture of the converging optical system at the optical disk side required for the reproduction of the information in the second optical disk (where NA2>NA1), NAL be the numerical aperture at the optical disk side of the light flux passing through the border between the divisional surfaces Sd1 and Sd2 of the objective lens 16, and NAH be the numerical aperture at the optical disk side of the light flux passing through the border between the divisional surfaces Sd2 and Sd3 of the objective lens 16.

Regarding the objective lens 16, first, the first aspherical surface of the first refracting surface S1 and the second refracting surface S2 (common refracting surface) are designed in such a manner as to make the best wave front aberration of the light flux converged on the first optical disk having the transparent substrate with the thickness t1 equal to or less than $0.07\lambda_1$ rms or desirably $0.05\lambda_1$ rms. FIG. 7(c) is the drawing of the spherical aberration obtained by this design. Further, the second aspherical surface of the first refracting surface S1 is designed with the second refraction surface S2 (common refracting surface) left as it is in such a manner as to make the spherical aberration less than the spherical aberration (FIG. 7(e), t2>t1 in this case) produced when the light flux is converged on the second optical disk having the transparent substrate with the thickness t2 (t2≠t1) through the lens having this first aspherical surface. At this time, it is favorable to make the paraxial radius of curvature of the second aspherical surface and the paraxial radius of curvature of the first aspherical surface the same for the purpose of making a good reproduction of the second optical disk which is subjected to reproduction in the defocused state. The graph of the spherical aberration of the lens obtained by this design at the time when the light flux is converged on the second optical disk is shown in FIG. 7(f), and the graph of the aberration at the time when the light flux is converged on the first optical disk by this lens is shown in FIG. 7(d). Then, the second aspherical surface is combined in the neighborhood of the numerical aperture of the first aspherical surface NA2 required for the second optical disk. In the above, it is desirable that the neighborhood of the required numerical aperture NA2 where the second aspherical surface is combined is between the numerical aperture NA3 and the numerical aperture NA4 of the objective lens 16 at the optical disk side, which satisfy not only the condition 0.60(NA2)<1.3(NA2) (This lower limit 0.60 (NA2) should desirably be 0.80(NA2) in practical use or more desirably 0.85(NA2), and this upper limit 1.3(NA2) should desirably be 1.1(NA2) in practical use.) but also the condition 0.01<NA4 −NA3<0.12(desirably 0.1). In this combined second aspherical surface (second divisional surface), the edge near the optical axis is let to have the numerical aperture NAL and the farther edge from the optical axis is let to have the numerical aperture NAH (that is, NAL<NAH).

Accordingly, regarding the shape of the surface in the refracting surface S1 of the objective lens 16, the first divisional surface Sd1 including the optical axis and the third divisional surface Sd3 which is positioned farther from the optical axis than the first divisional surface Sd1 have the same aspherical shape (the first aspherical surface), and the second divisional surface which is positioned between the first divisional surface Sd1 and the third divisional surface Sd3 (in the neighborhood of the numerical aperture NA2 required for the reproduction of the second optical disk, that is, from NAL to NAH) has a different aspherical shape from the first divisional surface Sd1 and the third divisional surface Sd3 (the second aspherical surface). The obtained lens is the objective lens 16 of this embodiment of the invention; the graph of the spherical aberration at the time when the light flux is converged on the first optical disk by using this objective lens 16 is shown in FIG. 7(a), and the graph of the spherical aberration at the time when the light flux is converged on the second optical disk by using this objective lens 16 is shown in FIG. 7(b).

Moreover, it is possible to make it larger the light quantity of the converged light flux at the time of reproducing the first optical disk, by utilizing the phase difference produced by combining the first divisional surface and the second divisional surface, with the second divisional surface Sd2 a little shifted in the direction of the optical axis when they are combined.

In this embodiment of the invention, the equation of the aspherical surface is based upon the following expression:

$$x = (H^2/r)\Big/\left[1 + \sqrt{1-(1+K)(H/r)^2}\right] + \sum_j A_j H^{P_j}$$

where X is an axis in the direction of the optical axis and H is an axis in the direction perpendicular to the optical axis, with the direction of the progressing of light made positive, r is the radius of curvature in the neighborhood of the optical axis, K is the cone coefficient, Aj is the aspherical coefficient, and Pj is the number of the power of the aspherical surface (where Pj>3). Further, in this invention, an equation of the spherical surface other than the above-described one may be used. In obtaining the equation of the spherical surface from the shape of the aspherical surface, Pj is substituted by a natural number as 3<Pj<1, and K is substituted by zero as K=0 in the above equation.

As described in the above, the objective lens 16 obtained in this embodiment has a structure such that the spherical aberration varies discontinuously at least two numerical aperture positions (NAL and NAH) in the neighborhood of the numerical aperture NA2, in order that a plurality of optical disks having the transparent substrate with different thickness may be reproduced by a single converging optical system. Because the lens is made to have a structure such that the spherical aberration varies discontinuously as described in the above, the light flux (in this embodiment, the first light flux—the third light flux) passing through the respective ranges of the numerical apertures (in this embodiment, the first divisional surface from the optical axis to NAL, the second divisional surface from NAL to NAH, and the third divisional surface from NAH to NA1) can be made up arbitrarily; hence, it becomes possible that the first light flux is utilized for the reproduction of all the optical disks to be reproduced, and the second light flux and the third light flux are utilized for the predetermined optical disk out of the plural optical disks respectively, and a plurality of optical disks can be reproduced by a single converging optical system (the objective lens 16 in this embodiment); thus the optical pick up can be actualized at a low cost and without a complex structure, and further, it can cope with an optical disk requiring a high numerical aperture. On top of that, the stop 17 is provided in such a manner as to correspond to only NA1, which is the highest numerical aperture, and any means for varying the stop 17 is needed even if the numerical aperture required for the reproduction of the optical disk varies (to NA1 or to NA2). In addition, the sentence "the spherical aberration varies discontinuously" in this invention means that an abrupt variation is observed as seen in the graph of the spherical aberration.

Further, regarding the direction of the discontinuous variation of the spherical aberration, when observed from the smaller numerical aperture to the larger numerical aperture, the spherical aberration varies in the negative direction at the numerical aperture NAL, and in the positive direction at the numerical aperture NAH. Owing to this, the reproduction of the optical disk having the thin transparent substrate with the thickness t1 is made satisfactory, and at the same time, the reproduction of the optical disk having the thick transparent substrate with the thickness t2 can be carried out satisfactorily. In addition, because t2>t1 and NA1>NA2 in this embodiment, the spherical aberration varies discontinuously in the negative direction at the numerical aperture NAL and in the positive direction at the numerical aperture NAH as described in the above, but in the case where t2<t1 and NA1>NA2, the spherical aberration varies discontinuously in the positive direction at the numerical aperture NAL and in the negative direction at the numerical aperture NAH.

Further, in reproducing the second optical disk having the transparent substrate with the thickness t2, the S figure characteristic of the optical pickup apparatus 10 is improved by making it positive the spherical aberration from the numerical aperture NAL to the numerical aperture NAH (the spherical aberration of the light flux passing through the second divisional surface Sd2). In addition, because t2>t1 and NA1>NA2 in this embodiment, the spherical aberration from the numerical aperture NAL to the numerical aperture NAH is made to be positive, but in the case where t2<t1 and NA1>NA2, it is proper to make the spherical aberration negative.

Further, in the case of reproduction through the transparent substrate with the thickness t1 (refer to FIG. 7(a)), by making it less than $0.07\lambda_1$ rms or desirably $0.05\lambda_1$ rms (where $\lambda_1$ is the wavelength of the light source) the wave front aberration by the light flux excluding the one passing through the surface from NAL to NAH out of the light flux with the numerical aperture NA1, that is, the light flux passing through the surfaces from the optical axis to NAL and from NAH to NA1, the reproduction of the first optical disk having the substrate with the thickness t1 is made satisfactory.

Further, if t1=0.6 mm, t2=1.2 mm, 610 nm<$\lambda_1$<680 nm, 740 nm<$\lambda_2$<870 nm, preferably, 740 nm<$\lambda_2$<810 nm, and 0.40<NA2<0.51, it is desirable that the condition 0.60(NA2)<NAL<1.3(NA2) is satisfied (this lower limit 0.60(NA2) should desirably be 0.80(NA2), or more desirably 0.85(NA2) in practical use, and the upper limit should desirably be 1.1(NA2)). If NAL exceeds the lower limit, the side lobe becomes too large to make a precise reproduction of the information, and if NAL exceeds the upper limit, the light flux is limited too more in excess to produce the spot diameter of diffraction limit estimated at the wavelength $\lambda_2$ and the numerical aperture NA2. In addition, NAL referred to in the above indicates the NAL on the second divisional surface Sd2 at the time when the second light source 112 is used.

Further, it is desirable that the condition 0.01<NAH−NAL<0.12 is satisfied (this upper limit 0.12 should desirably be 0.1 in practical use). If it exceeds this lower limit, the spot shape at the time of reproducing the second optical disk becomes worse, and the side lobe spot diameter becomes larger; if it exceeds the upper limit, the spot shape at the time of reproducing the first optical disk is made disordered to bring about the decrease of the light quantity. In addition, NAL and NAH referred to in the above indicate the NAL and NAH on the second divisional surface in the case where the second light source 112 is used.

Further, at the time of reproducing the second optical disk (at the time of reproduction through the transparent substrate with the thickness t2), it is desirable that the condition that the spherical aberration for the range from the numerical aperture NAL to the numerical aperture NAH is from $-2(\lambda_2)/(NA2)^2$ to $5(\lambda_2)/(NA2)^2$ is satisfied. Further, this condition should desirably be such that said spherical aberration is equal to or smaller than $3(\lambda_2)/(NA2)^2$ at the time of reproduction, and considering the recording (reproduction can also be made, of course), said aberration should desirably be larger than zero. If the aberration exceeds this lower limit, the spherical aberration is corrected in excess to make it worse the spot shape at the time of reproducing the first optical disk, and if it exceeds the upper limit, the spot shape at the time of reproducing the second optical disk is made worse, and the side lobe spot diameter becomes larger. In particular, it is more desirable that this condition is such that said aberration falls within the range from 0 to $2(\lambda_2)/(NA2)^2$, and if it is satisfied, the focus error signal can be satisfactorily obtained.

Further, to state it from another point of view, the above-described NAL and NAH are provided (that is, the divisional surface utilized mainly for the reproduction of the second optical disk is provided) between the numerical aperture NA3 and the numerical aperture NA4 of the objective lens 16 at the optical disk side, which satisfy not only the condition that 0.60(NA2)<NA3<1.3(NA2) (this lower limit 0.60(NA2) should desirably be 0.80(NA2), or more desirably 0.85(NA2) in practical use, and the upper limit should desirably be 11.1(NA2)) but also the condition that 0.01<NA4−NA3<0.12 (desirably 0.1). Owing to this, for the second optical disk, an optical disk requiring a larger numerical aperture can be reproduced, without lowering the intensity of the light spot converged on the first optical disk.

Further, it is desirable that the angle made by the normal line to the refracting surface S1 of the objective lens 16 and the optical axis varies by an amount from 0.05° to 0.5° between the circumferential positions of said refracting surface S1 corresponding to the two aperture positions in the neighborhood of the numerical aperture NA2 (NAL and NAH). If the difference exceeds this lower limit, the spot shape at the time of reproducing the second optical disk becomes worse, and the side lobe spot diameter becomes larger; if it exceeds the upper limit, the spherical aberration is corrected in excess, making the spot shape at the time of reproducing the first optical disk worse.

In particular, in the case where t2>t1 and NA1>NA2, as seen in the direction from the optical axis to the circumference, at the numerical aperture NAL, the point where the normal line to the refracting surface intersects the optical axis shifts discontinuously to the nearer direction to the refracting surface facing toward the light source, and at the numerical aperture NAH, the point where the normal line to the refracting surface intersects the optical axis shifts discontinuously to the farther direction from the refracting surface facing toward the light source. Owing to this, the reproduction of the optical disk having the thin transparent substrate with the thickness t1 is made satisfactory, and the reproduction of the optical disk having the thick transparent substrate with the thickness t2 can also be performed satisfactorily.

Figure 8:
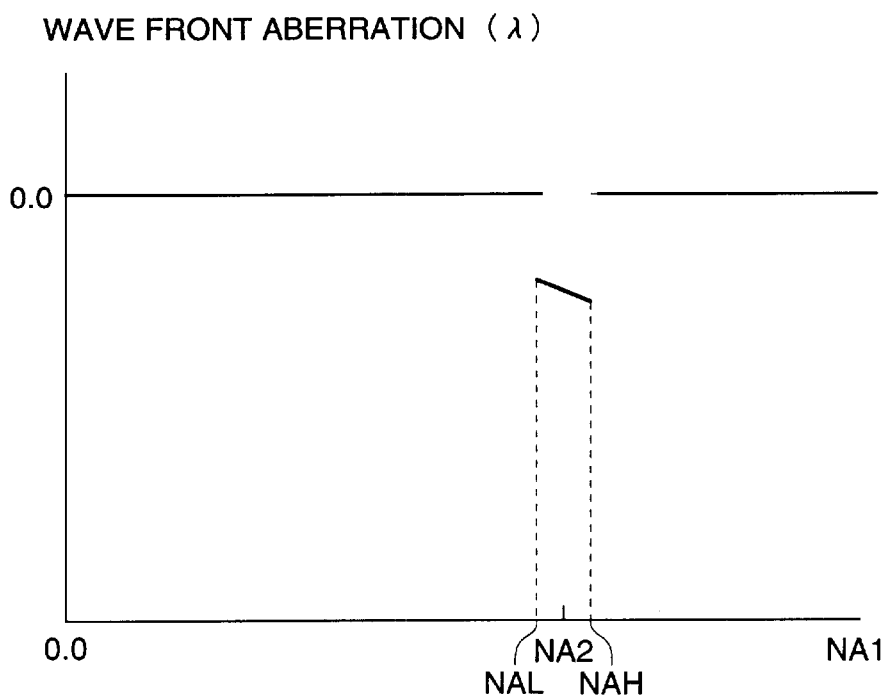
FIGS. 8(a) and 8(b) are diagrams showing wave front aberration curves.
Figure 8:
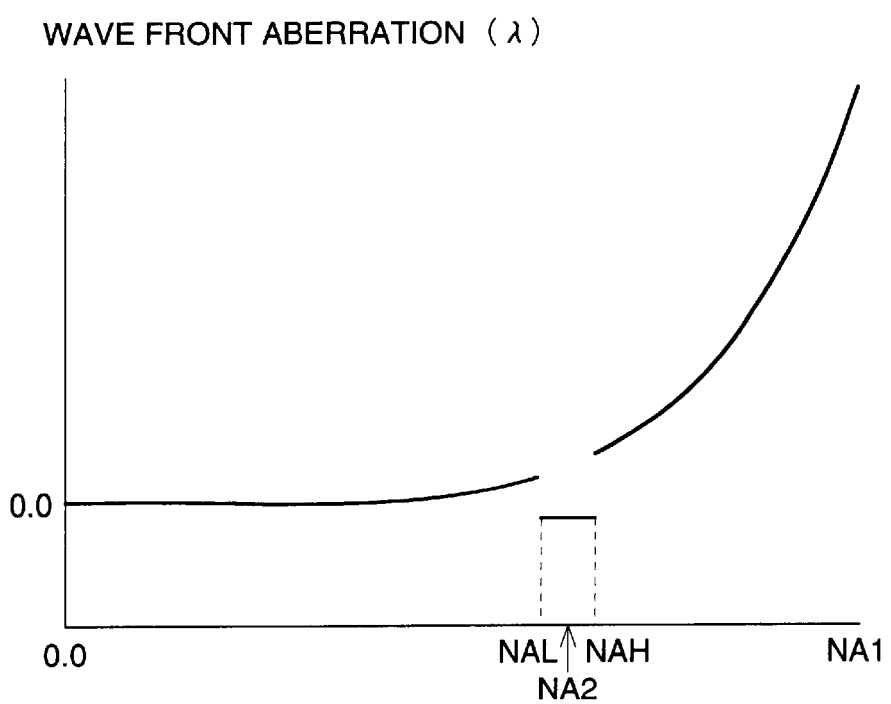

Further, the wave front aberration of the objective lens 16 of this embodiment is the one as shown in FIGS. 8(a) and 8(b). FIGS. 8(a) and 8(b) show wave front aberration curves with the wave front aberration ($\lambda$) taken for the ordinate and the numerical aperture taken for the abscissa; FIG. 8(a) shows the wave front aberration at the time when the transparent substrate of the first optical disk (thickness t1) is in the optical path, and FIG. 8(b) shows that at the time when the transparent substrate of the second optical disk (thickness t2) is in the optical path with a solid line respectively. In addition, this wave front aberration curve is obtained by measuring the wave front aberration using an interferometer or the like, on the condition that the wave front aberration becomes best when each of the transparent substrate is in the optical path.

As is understood from the drawing, regarding the objective lens 16 of this embodiment, the wave front aberration, as observed in the wave front aberration curves, becomes discontinuous at the two points in the neighborhood of the numerical aperture NA2 (namely, at NAL and NAH). Further, it is desirable that the maximum amount of discontinuity of the wave front aberration produced at the points where the curve is discontinuous, if it is expressed it in the unit of length (mm), is equal to or smaller than $0.05(NA2)^2$ (mm), or if it is expressed in the unit of phase difference (rad), it is equal to or smaller than $2\pi(0.05(NA2)^2)/\lambda$ (rad) (where $\lambda$ is the used wavelength in mm unit). If it becomes larger than this, the fluctuation of the wave front aberration with the fluctuation of the wavelength becomes too large to absorb the dispersion of the wavelength of the semiconductor laser. Further, the inclination of the wave front aberration curve in this discontinuous portion (between NAL and NAH) is different from the inclination of the straight line connecting the end points of the curves (broken line in FIG. 8(a)) in both sides of the discontinuous portion (the end point nearest to NAL and the end point nearest to NAH).

Further, the invention should not be confined to the contents described in this embodiment, that is, that the divisional surfaces Sd1–Sd3 are provided on the refracting surface S1 of the objective lens 16, that an objective lens of an infinite system is employed, that a step is provided on the divided surface, the number of the divisional surfaces, the shape of the second divisional surface, and so forth.

Further, in this embodiment, the first light source 111 and the second light source 112 are combined by the composing means 19; however, the invention should not be limited to this, and it is possible that, in the optical pickup apparatus shown in FIG. 1, the light source 11 (referred to either light source) is switched over between the first light source 111 and the second light source 112.

Further, regarding the objective lens 16 in this embodiment, when the applicant employed it in the optical pickup apparatus shown in the embodiment described in the foregoing through an error, surprisingly, the reproduction of a CD as the second optical disk, in addition to the reproduction of a DVD as the first optical disk as a matter of course, could be performed with the light source having the same wavelength. That is, the objective lens 16 of this embodiment can converge a light flux on the first optical information recording medium having the transparent substrate with the thickness t1 and on the second optical information recording medium having the transparent substrate with the thickness t2 (where t2≠t1), using the light source having the wavelength $\lambda_1$, and even in the case where the light source having the wavelength $\lambda_2$ is used (where $\lambda_2 \neq \lambda_1$), it can also converge a light flux on the information recording plane of the second optical information recording medium. Owing to this, the objective lens for use in the optical pickup apparatus for reproducing a DVD and CD-R using two light sources having different wavelengths (coping with the light source having the wavelength 610–670 nm for a DVD and the light source having the wavelength 780 nm which is essential to a CD-R) and the objective lens for use in the optical pickup apparatus for reproducing a DVD and a CD with a single light source (coping with the light source having the wavelength 610 nm–670 nm) can be substituted by a single lens for common use; hence, it can be actualized to make the cost reduced with larger amount of production. In addition, in order to make the lens common, it is necessary that the conditions for NAL and NAH described in the embodiment are satisfied also in the case where the wavelength of the light source is changed over from $\lambda_1$ to $\lambda_2$.

Further, in this embodiment, because the first light source 111 and the second light source 112 are used in approximately the same magnification, it is possible to use the single photo-detector 30 for making the structure simple; however, it is appropriate to provide two photo-detectors corresponding to the respective light sources 111 and 112, and further, the magnification may be different for each.

(Another embodiment)

Figure 9:
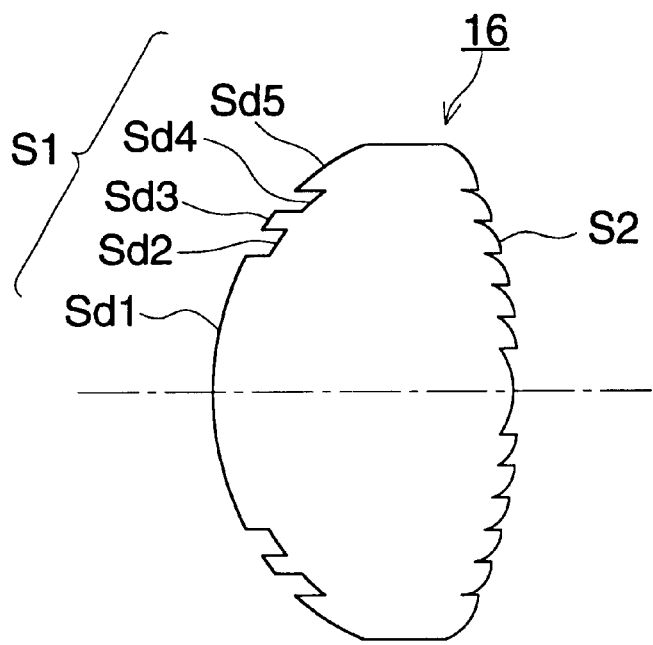
FIG. 9(a) is a cross-sectional view showing an objective lens schematically.
FIG. 9(b) is a front view of the objective lens viewing from a light source side.
Figure 9:
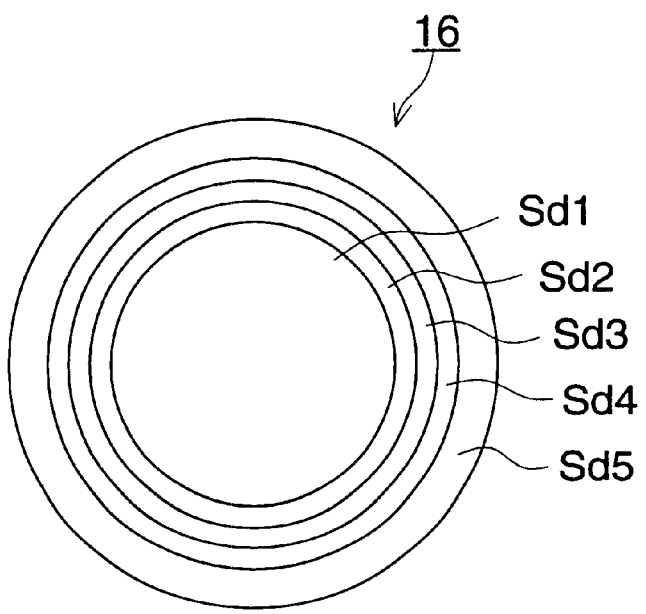

In the following, another embodiment will be explained with reference to FIGS. 9(a) and 9(b) showing schematically the optical lens 16. FIG. 9(a) is a cross-sectional view of the objective lens 16, and FIG. 9(b) is a front view seen from the light source side. This embodiment is a modified example of the objective lens 16 for use in the optical pickup apparatus noted in the embodiment described in the foregoing, and the objective lens 16 of this embodiment have its surface facing toward the light source divided into five divisional refracting surfaces, while the objective lens 16 noted in the above-described embodiment has its surface facing toward the light source divided into three divisional refracting surfaces. In addition, this embodiment is the one having five divisional surfaces, and in other points the lens is the same as that of the embodiment described in the foregoing; hence, the explanation will be sometimes omitted.

In this embodiment, the objective lens 16 is a convex lens wherein the refracting surface facing toward the light source S1 and the refracting surface facing toward the optical disk both have a shape of an aspherical surface and a positive refracting power. Further, the refracting surface of the objective lens 16 facing toward the light source S1 is composed of five divisional surfaces formed by concentric circles, namely, the first divisional surface Sd1—fifth divisional surface Sd5, that is, to state it generally, it is composed of, in the order of the direction to farther from the optical axis, the first divisional surface Sd1 including the optical axis (in the neighborhood of the optical axis), the second divisional surface, - - - , the (2n+1)th divisional surface Sd(2n+1) (where n is a natural number, and n=2 in this embodiment). By providing a step, a difference in surface level, at each of the borders of the divisional surfaces Sd1–Sd5, the respective divisional surfaces Sd1–Sd5 are formed. This objective lens 16 has a structure such that the light flux passing through the first divisional surface Sd1 including the optical axis (the first light flux) is utilized for the reproduction of the information recorded in the first optical disk and for the reproduction of the information recorded in the second optical disk, the light flux passing through the 2n-th divisional surface Sd2n (in this embodiment, the second divisional surface Sd2 and the fourth divisional surface Sd4) are utilized mainly for the reproduction of the information recorded in the second optical disk, and the light flux passing through the (2n+1)th divisional surfaces Sd(2n+1) (in this embodiment, the third divisional surface Sd3 and the fifth divisional surface Sd5) are utilized mainly for the reproduction of the information recorded in the first optical disk.

As mentioned in the above, in this embodiment, by increasing the number of the divisional surfaces, the 2n-th divisional surfaces can be disposed at the positions of higher NA values; hence, not only the reproduction of the first optical disk requiring a high NA, but also the reproduction of, as the second optical disk, an optical disk requiring a higher NA in comparison with that in the embodiment described in the foregoing can be performed. On top that, the (2n-1)th divisional surface (but the first divisional surface is not concerned) can compensate for the lowering of the light quantity at the time of reproducing the first optical disk resulted from the 2n-th divisional surface being disposed at the positions of high NA; thus, not only the first optical disk but also the second optical disk can be reproduced satisfactorily.

To state it concretely, regarding the objective lens 16, first, the first aspherical surface of the first refracting surface S1 and the second refracting surface S2 (common refracting surface) are designed in such a manner as to make it equal to or less than $0.05\lambda_1$ rms the best wave front aberration of the light flux converged on the first optical disk having the transparent substrate with the thickness t1. Further, the second aspherical surface of the first refracting surface S1 is designed with the second refraction surface S2 (common refracting surface) left as it is in such a manner as to make the spherical aberration less than the spherical aberration produced when the light flux is converged on the second optical disk having the transparent substrate with the thickness t2 (t2≠t1) through the lens having this first aspherical surface. At this time, it is favorable to make the paraxial radius of curvature of the second aspherical surface and the paraxial radius of curvature of the first aspherical surface the same for the purpose of making a good reproduction of the second optical disk which is subjected to reproduction in the defocused state. The second aspherical surface is combined between the two positions NAL–NAH which is in the neighborhood of the numerical aperture NA2 of the first aspherical surface required for the reproduction of the second optical disk. The lens obtained in this way is the objective lens 16 of this embodiment.

Further, it is possible to make it larger the light quantity of the converged light flux at the time of reproducing the first optical disk, by utilizing the phase difference produced by combining the first divisional surface and the second divisional surface, with the second divisional surface Sd2 and the fourth divisional surface Sd4 a little shifted in the direction of the optical axis when they are combined. Besides, the second divisional surface Sd2 and the fourth divisional surface Sd4 are designed to be the same aspherical surface; however, it may be appropriate for these to use different aspherical surfaces to each other, and the amount of shifts of them may be different to each other.

In the above, it is desirable that the neighborhood of the required numerical aperture NA2 where the second aspherical surface is combined is between the numerical aperture NA3 and the numerical aperture Na4 of the objective lens 16 at the optical disk side, which satisfy not only the condition that 0.60(NA2)<1.3(NA2) (This lower limit 0.60(NA2) should desirably be 0.80(NA2) in practical use or more desirably 0.85(NA2), and this upper limit 1.3(NA2) should desirably be 1.1(NA2) in practical use; further, the upper limit 1.3(NA2) should be 1.1 in the case where the wavelength of the light source is 740 nm–870 nm when the second optical disk information recording medium is subjected to recording or reproduction.) but also the condition that 0.01<NA4–NA3<0.12 (This upper limit 0.12 should desirable be 0.1 in practical use.).

In this embodiment as described in the above, as in the embodiment described in the foregoing, when a DVD as the first optical disk having the transparent substrate with the thickness t1 of 0.6 mm is reproduced, the light flux passing through the first divisional surface Sd1, the third divisional surface Sd3, and the fifth divisional surface Sd5 respectively converges on approximately the same positions, one of which is a first image forming position, and the wave front aberration (the wave front aberration when the light flux passing through the second divisional surface Sd2 and the fourth divisional surface Sd4 are excluded) is equal to or less smaller $0.05\lambda_1$ rms, where $\lambda_1$ is the wavelength of the light source.

At this time, the light flux passing through the second divisional surface Sd2 and the fourth divisional surface Sd4 respectively converges on the second image forming position which is different from the first image forming position. This second image forming position should be at a distance from $-40\,\mu m$ to $-4\,\mu m$ or desirably from $-27\,\mu m$ to $-4\,\mu m$ from the first image forming position, supposing that the first image forming position is at zero, the objective lens side of it is negative, and the reverse side is positive. Further, in this embodiment, because t1<t2 and NA1>NA2, the second image forming position should be at a distance from $-40\,\mu m$ to $-4\,\mu m$ or desirably from $-27\,\mu m$ to $-4\,\mu m$ from the first image forming position; however, in the case where t1>t2 and NA1>NA2, the second image forming position should be at a distance from $4\,\mu m$ to $40\,\mu m$ or desirably from $4\,\mu m$ to $27\,\mu m$ from the first image forming position. That is, the absolute value of the distance between the first optical position and the second optical position should fall within the range from $4\,\mu m$ to $40\,\mu m$ or desirably from $4\,\mu m$ to $27\,\mu m$.

Further, to consider this objective lens 16 from the view point of spherical aberration, it has a structure such that the spherical aberration varies discontinuously at four numerical aperture positions in the neighborhood of the numerical aperture NA2, so that a plurality of disks having the transparent substrate which is different in thickness to others may be reproduced by a single converging optical system. The spherical aberration varies discontinuously in this manner (the direction of varying is the same as that in the embodiment described in the foregoing), and if it is considered from the view point of wave front aberration, the wave front aberration becomes discontinuous at four positions in the neighborhood of the numerical aperture NA2, and the inclination of the wave front aberration curve in each of these discontinuous portions is different from the inclination of each of the straight lines connecting the end portions of the curves at the both sides of each of the discontinuous portions.

Regarding the objective lens 16 of this embodiment as described in the above, at the time of reproducing the second optical disk (at the time of reproduction through the transparent substrate with the thickness t2), it is desirable that the condition that the spherical aberration for the range from the numerical aperture NAL to the numerical aperture NAH is from $-2(\lambda)/(NA2)^2$ to $5(\lambda)/(NA2)^2$ is satisfied (where $\lambda$ in the above is the wavelength of the light source used in reproducing the second optical disk). Further, this condition should desirably be such that said spherical aberration is equal to or smaller than $3(\lambda)/(NA2)^2$ in the case of reproduction, and considering the case of recording (reproduction can also be made, of course), said aberration should desirably be larger than zero.

On the other hand, in this embodiment, with regard to the central position of the 2n-th divisional surface (the second divisional surface Sd2 or the fourth divisional surface sd4) in the direction perpendicular to the optical axis, the angle between the normal line to the 2n-th divisional surface and the optical axis should be larger than the angle between the normal line to the surface which is interpolated from the (2n−1)th divisional surface (the first divisional surface Sd1 or the third divisional surface Sd3) and the (2n+1)th divisional surface (the third divisional surface Sd3 or the fifth divisional surface Sd5) and the optical axis. Owing to this, it is possible to reproduce satisfactorily both of the first optical disk and the second optical disk. In addition, in this embodiment, because t2>t1 and NA1>NA2, the angle between the normal line to the 2n-th divisional surface and the optical axis should be larger than the angle between the normal line to the surface interpolated from the (2n−1)th divisional surface and the (2n+1)th divisional surface and the optical axis, but in the case where t2<t1 and NA1>NA2, it is proper to make it smaller.

Further, in this embodiment of the invention, it is desirable that the first divisional surface Sd1—the (2n+1)th divisional surface are determined in a manner such that, with regard to the approximately central position of the 2n-th divisional surface, namely the second divisional surface Sd2 or the fourth divisional surface Sd4, in the direction perpendicular to the optical axis, the difference between the angle made by the normal line to the 2n-th divisional surface and the optical axis and the angle made by the normal line to the surface interpolated from the (2n−1)th divisional surface and the (2n+1)th divisional surface (an aspherical surface obtained from fitting by least square method using the equation (1) of the aspherical surface) and the optical axis falls within the range from 0.02° to 1.0°.

Further, if this embodiment of the invention is grasped from another point of view as the embodiment described in the foregoing, in the objective lens 16 having a plurality of divisional surfaces (five divisional surfaces in this embodiment) formed by dividing at least one of its surfaces by concentric circles with regard to the optical axis, on the condition that the light which has passed through the (2n−1)th divisional surface which is nearer to the optical axis than the 2n-th divisional surface (where n is a natural number equal to or larger than one), and the light which has passed through the (2n+1)th divisional surface which is positioned at the reverse side of the 2n-th divisional surface against the optical axis are let to have approximately the same phase through the transparent substrate with the predetermined thickness (the first optical disk), and let the phase difference between the light which has passed through the (2n−1)th divisional surface and the transparent substrate and the light which has passed through the portion of the 2n-th divisional surface (the second divisional surface Sd2 or the fourth divisional surface Sd4, for example) which is to the optical axis side of the approximately central position of the 2n-th divisional surface in the direction perpendicular to the optical axis be $(\Delta nL)\pi$ ($(\Delta 1L)\pi$ or $(\Delta 2L)\pi$, for example) (rad), and the phase difference between the light which has passed through the (2n+1) divisional surface and the transparent substrate and the light which has passed through the portion of the 2n-th divisional surface which is to the reverse side of the above-mentioned central position against the optical axis and the transparent substrate be $(\Delta nH)\pi$ ($(\Delta 1H)\pi$ or $(\Delta 2H)\pi$, for example) (rad), then following inequality $(\Delta nH) > (\Delta nL)$ is established. In this case, as in the embodiment described in the foregoing, in the case where t1>t2 and NA1>NA2, the inequality $(\Delta nH)<(\Delta nL)$ should be established; accordingly $(\Delta nH) \neq (\Delta nL)$.

To state this from another point of view, the difference in surface level of the 2n-th divisional surface (the second divisional surface Sd2 or the fourth divisional surface Sd4, for example) from the (2n+1)th divisional surface (the third divisional surface sd3 or the fifth divisional surface Sd5) is larger than the difference in surface level of the 2n-th divisional surface (the second divisional surface Sd2 or the fourth divisional surface Sd4, for example) from the (2n−1)th divisional surface (the first divisional surface sd1 or the third divisional surface sd3, for example). In the same way as the above-described, also in this case, in the case where t1>t2 and NA1>NA2, the difference in surface level of the 2n-th divisional surface from the (2n+1)th divisional surface is smaller than the difference in surface level of the 2n-th divisional surface from the (2n−1)th divisional surface. Further, it is desirable that, the difference between the position of the surface interpolated from the (2n−1)th divisional surface and the (2n+1)th divisional surface (for example, the first divisional surface and the third divisional surface, or the third divisional surface and the fifth divisional surface) and the position of the 2n-th divisional surface taken at an arbitrary position from the optical axis varies asymmetrically with regard to the approximately central position of the 2n-th divisional surface. Furthermore, in this case, it is desirable that the difference becomes larger with the distance from the optical axis.

Besides, in this embodiment, the refracting surface S1 of the objective lens 16 is divided into five divisions, but the invention is not confined to this, and it may be appropriate to provide the divisional surfaces on another optical element of the converging optical system (for example, such as a collimator lens), or it is possible to provide a separate optical element.

Further, in this embodiment, a step portion, that is, a difference in surface level is provided at each of the borders of the first divisional surface Sd1—the fifth divisional surface Sd5; however, it is possible to form the divided surface with at least one of the borders formed continuously without providing the step. In other case, it is possible that the border between the divisional surfaces are joined, for example, by a surface with a predetermined radius of curvature without bending the border surface. This curvature may be the one that is provided intentionally or unintentionally. An example of this unintentionally provided curvature is the curvature at the border formed in processing the metallic mold for forming the objective lens 16 with a plastic material etc.

Further, in this embodiment, on the refracting surface of the objective lens 16 facing toward the light source, each of the second divisional surface Sd2 and the fourth divisional surface Sd4 is provided in a ring shape formed by concentric circles with regard to the optical axis; however, the shape is not limited to a ring, but may be a broken ring. Further, the second divisional surface Sd2 and/or the fourth divisional surface Sd4 may be made up of a hologram or a Fresnel lens. In addition, in the case where the second divisional surface Sd2 is made up of a hologram, one of the light flux formed by dividing the original light flux into the zeroth order light and the first order light is utilized for the reproduction of the first optical disk and the other is utilized for the reproduction of the second optical disk. At this time, it is desirable that the light quantity of the light flux utilized for the second optical disk is larger than the light quantity of the light flux utilized for the reproduction of the first optical disk.

Further, in this embodiment, the reproduced signal from the second optical disk is made satisfactory by it that not only the condition that, when the first optical disk is reproduced (that is, when the light passes through the transparent substrate with the thickness t1), the best wave front aberration by the light flux passing through the first divisional surface Sd1 and that passing through the third divisional surface Sd3 is $0.07\lambda_1$ rms or desirably $0.05\lambda_1$ rms (where $\lambda_1$ (nm) is the wavelength of the light source used at the time of reproducing the first optical disk), but also the condition that, when the second optical disk is reproduced (that is, when the light passes through the transparent substrate with the thickness t2), the best wave front aberration by the light flux passing through the first divisional surface Sd1 is $0.07\lambda_2$ rms or desirably $0.05\lambda_2$ rms (where $\lambda_2$ (nm) is the wavelength of the light source used at the time of reproducing the second optical disk) is satisfied.

In the embodiments described in detail up to now, the first divisional surface is designed as the one including the optical axis; however, because the very narrow surface domain around the optical axis does not affect the converging of light so much, it may be allowed that the very narrow surface domain around the optical axis as the above-mentioned that does not affect the converging of light practically is flat, projected, or concave. The essential point is that a divisional surface to be utilized for the reproduction of the second optical disk is provided in the neighborhood of NA2 and the surface domain which is nearer to the optical axis than that (that is, the neighborhood of the optical axis) is made to be the first divisional surface.

Further, in the explanation given up to now, only the reproduction of the information recorded in an optical disk has been explained; however, the recording of information in an optical disk is quite similar to this from the view point that the light spot converged by a converging optical system is important, and it is needless to say that the embodiments described in the above can be used effectively in recording.

Besides, according to the embodiments described in the above, the effect to improve the S-figure characteristic of the focus error signal can be obtained.

In the following, explanation will be given with reference to FIGS. 10(*a*) and 10(*b*) concerning it that the phase of the light flux is shifted in order to strengthen as much as possible the light intensity of the spot formed on the information recording plane of the optical information recording medium. The explanation given in the following can be applied to the embodiment of the lens having the three divisional surfaces and also to the embodiment of the lens having the five divisional surfaces both described in the above.

Figure 10:
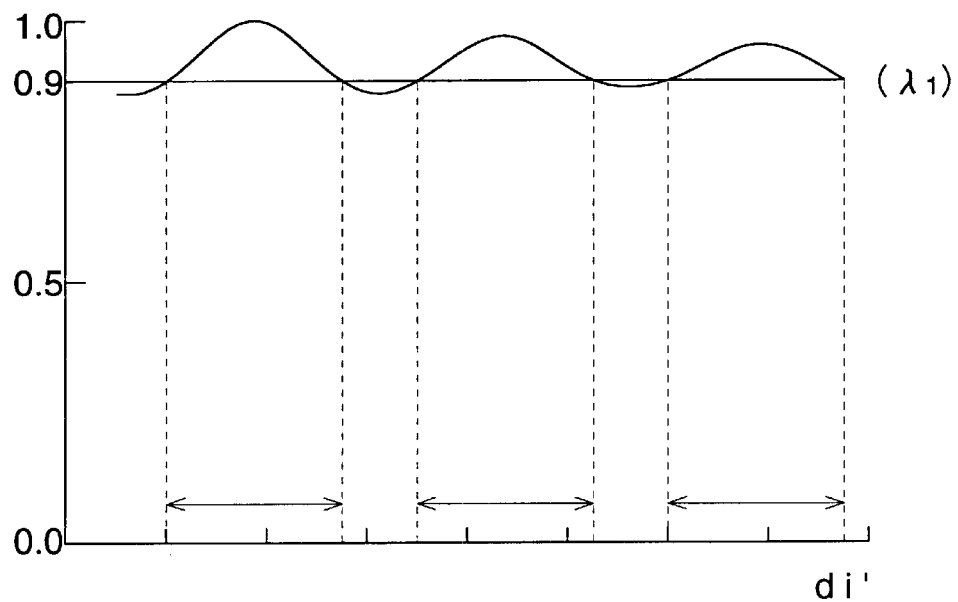
FIGS. 10(a) and 10(b) are diagrams showing a relationship between a peak intensity ratio and a phase.
Figure 10:
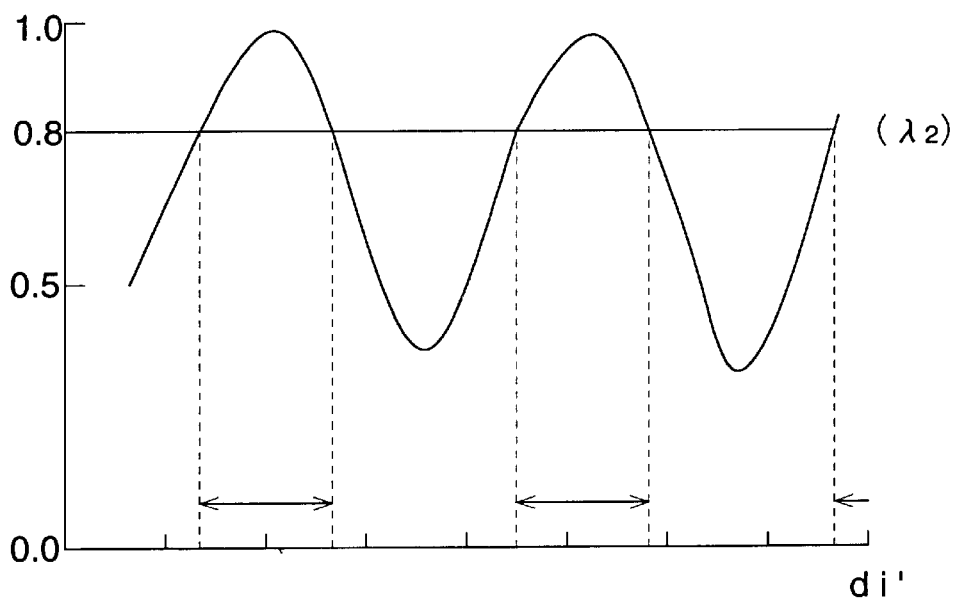

FIG. 10(*a*) shows a graph for the case where reading or recording of a first optical information recording medium is done using a first light source (wavelength $\lambda_1$) wherein the abscissa indicates the distance di' on the optical axis between the point where the second divisional surface of the first aspherical surface of the above-mentioned objective lens extended to the optical axis in accordance with the equation of the aspherical surface intersects the optical axis and the second surface (The surface opposite the first aspherical surface, which may be aspherical or spherical. A ring-zonal diffraction section is provided in the present example.), and the ordinate indicates the peak intensity ratio of the beam spot. Further, FIG. 10(*b*) shows a graph for the case where reading or recording of a second optical information recording medium is done using a second light source (wavelength $\lambda_2$), wherein the abscissa indicates the distance di' on the optical axis between the point where the second divisional surface of the above-mentioned objective lens extended to the optical axis in accordance with the equation of the aspherical surface intersects the optical axis and the second surface, and the ordinate indicates the peak intensity ratio of the beam spot.

The range of di' where the peak intensity ratio of the converged light flux on the first information recording plane of the first optical information recording medium, that is, it is preferable that the peak intensity ratio of the spot on the first information recording plane, becomes equal to or larger than 0.9. The range of di' for 0.9 or more is shown by an arrow mark in FIG. 10(*a*). Further, it is preferable that the peak intensity ratio of the spot on the converged second light flux on the second information recording plane of the second optical information recording medium, namely, the second information recording plane becomes 0.8 or more. The range of di' for 0.8 or more is shown by an arrow mark in FIG. 10(*b*).

By determining di' to a value in the range of di' where the range of di' to make the peak intensity equal to or larger than 0.9 in the graph of FIG. 10(*a*) and the range of di' to make the peak intensity equal to or larger than 0.8 in the graph of FIG. 10(*b*) overlap each other, that is, in the range of di' where the arrow marks in both FIG. 10(*a*) and FIG. 10(*b*) overlap, it is possible to form a spot having a strong light intensity on the information recording plane both in case of the first optical information recording plane and in case of the second optical information recording plane, which is preferable. Besides, it is also possible to reduce the size of the diameter of the light spot (determined by the position where the intensity becomes $e^{-2}$ with regard to the maximum central intensity). It may be more preferable to determine di' in a range in which a range in which the peak intensity ratio becomes larger than 0.95 in the graph of FIG. 10(*a*) overlaps on a range in which the peak intensity ratio becomes larger than 0.9 in the graph of FIG. 10(*b*). That is, it may be preferable that the peak intensity ratio becomes larger than 0.95 at the time of the first optical information recording medium and the peak intensity ratio becomes larger than 0.9 at the time of the second optical information recording medium.

Further, in order to strengthen as much as possible the light intensity of the spot formed on the information recording plane of the optical information recording medium, it may also be proper that the following equations and inequalities (1)–(6) are established:

$$W_1 - W_2 = m\lambda_1 - \delta \quad (1),$$

$$|m| \leq 10 \text{ (m is an integer including zero)} \quad (2),$$

$$0 \leq \delta < 0.34\lambda_1 \quad (3),$$

$$W_3 - W_4 = m\lambda_2 - \delta \quad (4),$$

$$|m| \leq 10 \text{ (m is an integer including zero)} \quad (5),$$

$$0 \leq \delta < 0.34\lambda_2 \quad (6),$$

where $W_1$ is the amount of the wave front aberration for the border step portion of the larger numerical aperture NA when the first light flux is used, $W_2$ is the amount of the wave front aberration for the border step portion of the smaller numerical aperture NA when the first light flux is used, $\lambda_1$ is the wavelength of the first light flux, $W_3$ is the amount of the wave front aberration for the border step portion of the larger numerical aperture NA when the second light flux is used, $W_4$ is the amount of the wave front aberration for the border step portion of the larger numerical aperture NA when the second light flux is used, and $\lambda_2$ is the wavelength of the first light flux.

It is more desirable that the following inequalities (3)' and (6)' are established instead of the inequalities (3) and (6):

$$0 \leq \delta < 0.25\lambda_1 \quad (3)',$$

$$0 \leq \delta < 0.25\lambda_2 \quad (6)'.$$

Further, it may also be proper that the following inequalities (3)" and (6)" are established instead of the inequalities (3)' and (6)':

$$0 < \delta < 0.34\lambda_1 \quad (3)'',$$

$$0 < \delta < 0.34\lambda_2 \quad (6)''.$$

Figure 11:
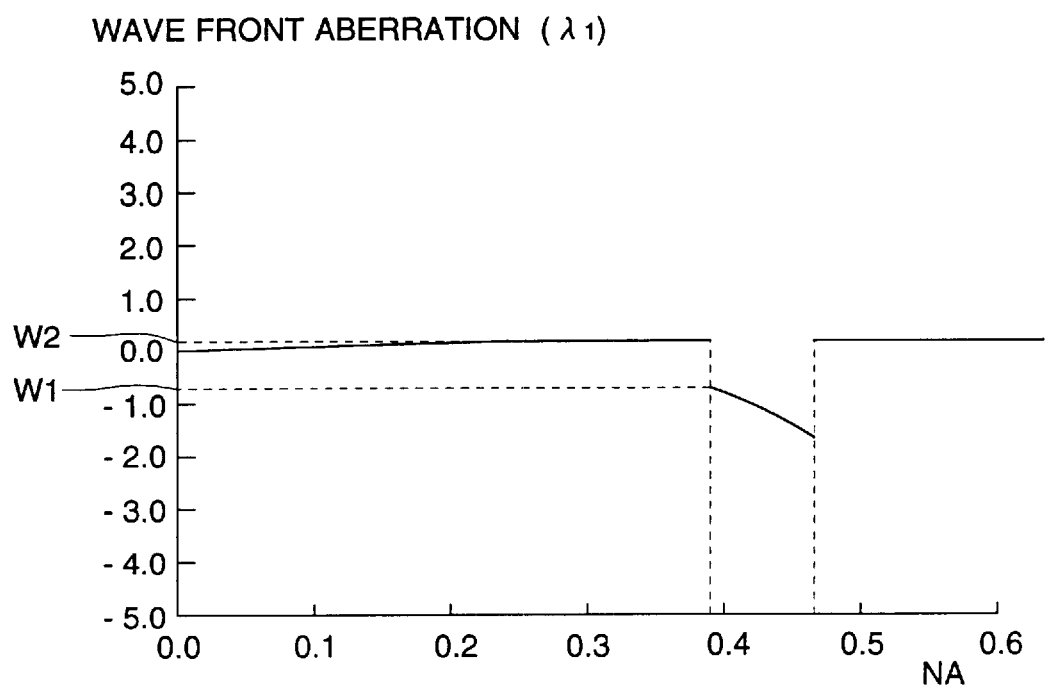
FIGS. 11(a) and 11(b) are diagrams showing wave front aberration curves of an objective lens.
Figure 11:
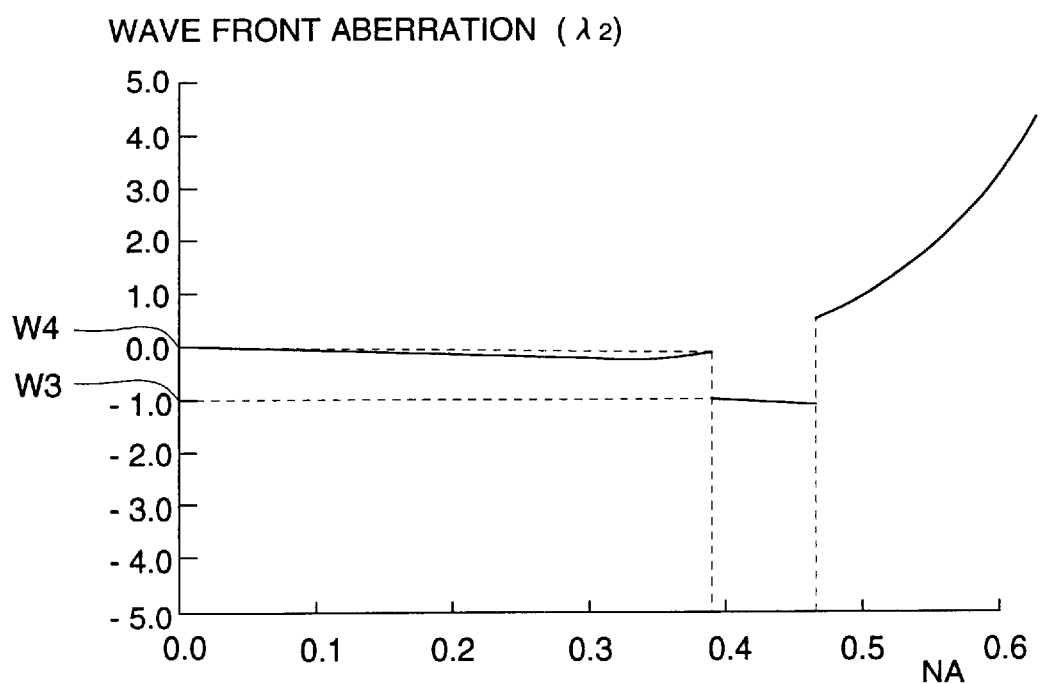

Further, it is desirable that $W_1$, $W_2$, $W_3$, and $W_4$ are the values of the wave front aberration at the border step portion produced at the border between the first divisional surface and the second divisional surface; however, they may be the values of the wave front aberration at the border step portion produced at the border between the second divisional surface and the third divisional surface. FIGS. 11(*a*) and 11(*b*) are the drawings showing the wave front aberration curve in the case where $W_1$, $W_2$, $W_3$, and $W_4$ are the values of the wave front aberration at the border step portion produced at the border between the first divisional surface and the second divisional surface using a wave front aberration graph.

Further, it is more desirable that the above-described equations and inequalities (1)–(6) are established both in the case where $W_1$, $W_2$, $W_3$, and $W_4$ are the values of the wave front aberration at the border step portion produced at the border between the first divisional surface and the second divisional surface and in the case where $W_1$, $W_2$, $W_3$, and $W_4$ are the values of the wave front aberration at the border step portion produced at the border between the second divisional surface and the third divisional surface.

Further, it is desirable that the objective lens is made of a plastic material, but it may be made of a glass material. Besides, it is also appropriate to accomplish the above-described conditions by providing an optical element other than an objective lens as a phase shifting means.

Furthermore, as an optical information recording medium reproducing or recording apparatus having the above-mentioned pickup device built-in, a DVD/CD player, a DVD/CD/CD-R player, a DVD/CD/CD-RW player, a DVD/LD player, a DVD/DVD-RAM/CD/CD-R player etc. can be cited. However, it should not be confined to these. Further, these optical information recording medium reproducing or recording apparatus have a power source, a spindle motor etc. in addition to the pickup device.

Examples of a chromatic-aberration-corrected lens of the invention will be shown in Tables 2 and 3 as follows. In Tables, ri represents a radius of curvature of a refracting surface, each of di and di' represents a distance between surfaces, and each of ni and ni' represents a refractive index at main wavelength. A form of an aspherical surface is shown with the following expression, $$Z = \frac{h^2/r}{1 + \sqrt{1-(1+\kappa)(h/r)^2}} \sum_i A_i h^{P_i}$$

wherein, Z represents an axis in the direction of an optical axis, h represents an axis in the direction perpendicular to an optical axis, the direction of light advancement is assumed to be positive, r represents the paraxial radius of curvature, A represents an aspherical surface coefficient and Pi represents an exponent of an aspherical surface.

Further, a diffraction surface is expressed with the following expression as a function of optical path difference, in the unit of mm, $$\Phi = \sum_{i=2}^{\infty} B_{2i} h^{2i}$$

TABLE 2

| | Example | | |
|---|---|---|---|
| Wavelength | 635 nm | 650 nm | 780 nm |
| Focal length | 3.36 | 3.36 | 3.357 |
| Aperture diameter | | 4.04 mm | |
| Lateral magnification of objective lens | | 0 | |

| Surface of No. | ri | di | di' | ni | ni' |
|---|---|---|---|---|---|
| 1 | ∞ | 0 | | 1 | 1 |
| 2 | 2.1227 | 2.2 | | 1.5300 1.5295 | 1.5255 |
| 3 | −9.24292 | 1.7742 | 1.3946 | 1 | 1 |
| 4 | ∞ | 0.6 | 1.2 | 1.5787 1.57789 | 1.5709 |
| 5 | ∞ | | | | |

Symbol ni shows refractive index at each wavelength in the top column.
Thickness on axis of second divisional portion on second surface is 2.1974 mm.
Symbols di and ni represent values for the first recording medium (t1 = 0.6 mm).
Symbols di' and ni' represent values for the second recording medium (t2 = 1.2 mm).

TABLE 3

| Aspherical surface data | | |
|---|---|---|
| Second surface | First and third | 0 ≤ H ≤ 1.321 (First divisional portion) |

TABLE 3-continued

Aspherical surface data

| | | | |
|---|---|---|---|
| | divisional portions (Aspherical surface coefficient) | $1.532 \leq H$ (Third divisional portion) $k = -5.9909 \times 10^{-1}$ $A1 = -1.0866 \times 10^{-3}$ $A2 = 3.8753 \times 10^{-3}$ $A3 = -7.9294 \times 10^{-3}$ $A4 = 1.1519 \times 10^{-2}$ $A5 = -8.7345 \times 10^{-3}$ $A6 = 2.8639 \times 10^{-3}$ $A7 = -2.4790 \times 10^{-7}$ $A8 = -1.6910 \times 10^{-4}$ $A9 = 8.2000 \times 10^{-8}$ | $P1 = 3.0$ $P2 = 4.0$ $P3 = 5.0$ $P4 = 6.0$ $P5 = 7.0$ $P6 = 8.0$ $P7 = 9.0$ $P8 = 10.0$ $P9 = 12.0$ |
| | Second divisional portion (Aspherical surface coefficient) | $1.321 \leq H \leq 1.532$ (Second divisional portion) $k = -6.0815 \times 10^{-1}$ $A1 = -6.7024 \times 10^{-4}$ $A2 = 4.7578 \times 10^{-3}$ $A3 = -1.0148 \times 10^{-2}$ $A4 = 1.3048 \times 10^{-2}$ $A5 = -8.7200 \times 10^{-3}$ $A6 = 2.6195 \times 10^{-3}$ $A7 = -3.4397 \times 10^{-6}$ $A8 = -1.3597 \times 10^{-4}$ $A9 = -1.7557 \times 10^{-6}$ | $P1 = 3.0$ $P2 = 4.0$ $P3 = 5.0$ $P4 = 6.0$ $P5 = 7.0$ $P6 = 8.0$ $P7 = 9.0$ $P8 = 10.0$ $P9 = 12.0$ |
| Third surface | Aspherical coefficient surface | $k = 1.9281 \times 10$ $A1 = 1.4684 \times 10^{-2}$ $A2 = -1.6723 \times 10^{-3}$ $A3 = -6.2421 \times 10^{-4}$ $A4 = 1.6783 \times 10^{-4}$ | $P1 = 4.0$ $P2 = 6.0$ $P3 = 8.0$ $P4 = 10.0$ |
| | Diffraction surface (Optical path difference function) | $B2 = -8.9238 \times 10^{-3}$ $B4 = -6.2130 \times 10^{-4}$ $B6 = 5.8382 \times 10^{-4}$ $B8 = -7.4492 \times 10^{-5}$ | |

Figures 12A, 12B:
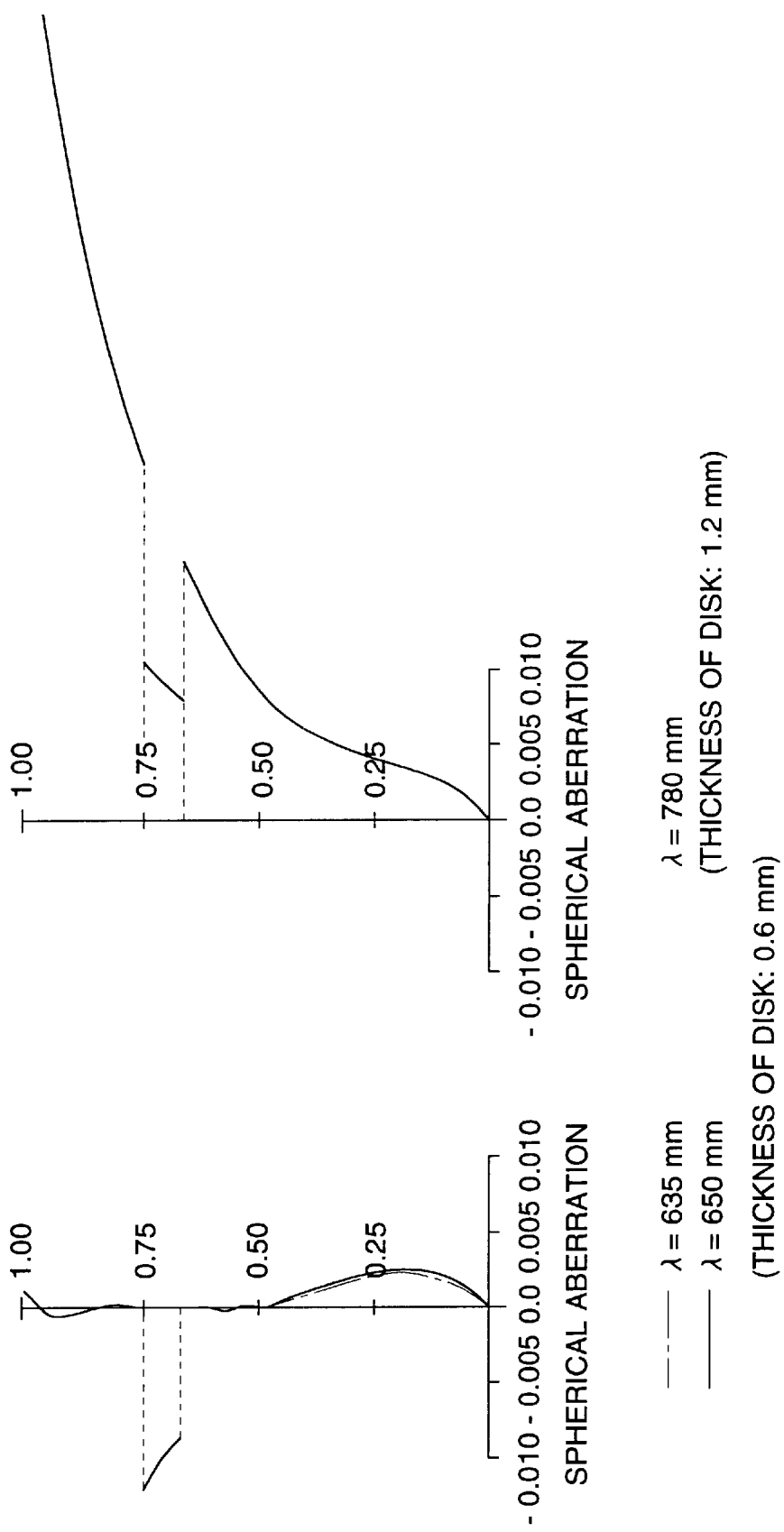
FIG. 12(a) shows spherical aberration in the example.
FIG. 12(b) shows chromatic aberration in the example.

Spherical aberration and chromatic aberration of the above-mentioned example are shown in FIGS. 12(a) and 12(b). Chain lines in FIG. 12(a) show the state of correction for light with wavelength of 635 nm, and solid lines show the state of correction for light with wavelength of 650 nm. For wavelength shifting of 15 nm, chromatic aberration is hardly caused.

FIG. 12(b) shows spherical aberration for light with wavelength of 780 nm. In this case, an influence of wavelength shifting is less, because recording density is lower than that in the case of FIG. 12(a).

An aberration-corrected objective lens for recording and/or reproducing of an optical information recording medium, an optical pickup apparatus and a recording/reproducing apparatus for an optical information recording medium of the invention, makes it possible to conduct recording and/or reproducing with a single converging optical system, even for optical information recording media each having a transparent substrate with different thickness, and to obtain image forming ability which is free from problem for optical information recording media to which high image forming capability is required, even when wavelength shifting of a light source is caused.

Incidentally, though an infinite objective lens is shown in the example, the same effect can also be obtained in the case of a finite objective lens.

Further, an optical pickup apparatus is not limited to the aforesaid example, and the invention can naturally be used advantageously for various known optical pickup apparatuses.

Disclosed embodiments can be varied by a skilled person without departing from the spirit of the invention.

What is claimed is:

1. An optical pickup apparatus for reproducing information from one of different kinds of optical information recording medium, each having a transparent substrate in different thickness, or for recording information onto one of said different kinds of optical information recording medium, said optical pickup apparatus comprising:

(a) a first light source for emitting light flux;

(b) a converging optical system having an optical axis, a ring-zonal diffraction section, and a refracting surface including a first divisional portion, a second divisional portion and a third divisional portion, wherein the third divisional portion is farther from the optical axis than the first divisional portion, and the second divisional portion is provided between the first divisional portion and the third divisional portion; and (c) an image sensor, wherein the first divisional portion and the third divisional portion are capable of converging the light flux on a first information recording plane of a first optical information recording medium having a first transparent substrate of thickness t1, to reproduce information recorded in the first optical information recording medium or recording information on the first optical information recording medium, wherein the first divisional portion and the second divisional portion are capable of converging the light flux on a second information recording plane of a second optical information recording medium having a second transparent substrate of thickness t2, to reproduce information recorded in the second optical information recording medium or recording information on the second optical information recording medium, wherein t2 is greater than t1, and wherein the image sensor is capable of receiving light flux reflected from the first information recording plane or the second information recording plane.

2. The optical pickup apparatus of claim 1,
wherein the following conditional expression is satisfied, $$0 <= |A+B| <= |A|$$

wherein A represents an amount of focal point shifting caused on the refracting surface by a wavelength change of a light flux emitted from the first light source, and B represents an amount of focal point shifting caused on the ring-zonal diffraction section by the wavelength change of the light flux emitted from the first light source.

3. The optical pickup apparatus of claim 2,
wherein the following conditional expression is satisfied, $$|A+B|=0.$$

4. The optical pickup apparatus of claim 2,
wherein the wavelength of the light flux emitted from the first light source is changed based on the change in an amount of electric current supplied to the first light source.

5. The optical pickup apparatus of claim 2 further comprising a second light source which emits a light flux whose wavelength is longer than that emitted from the first light source, and the conditional expression is satisfied for the light flux emitted only from the first light source.

6. The optical pickup apparatus of claim 1,
wherein the converging optical system has an objective lens which further has therein the optical axis, the refracting surface including the first divisional portion, the second divisional portion and the third divisional portion and the ring-zonal diffraction section, and the ring-zonal diffraction section is provided on the surface of the objective lens which is opposite to the refracting surface.

7. The optical pickup apparatus of claim 6,
wherein the ring-zonal diffraction section is provided on the mostly entire portion of the surface which is opposite to the refracting surface.

8. The optical pickup apparatus of claim 1,
wherein the converging optical system has an objective lens which further has the optical axis, the refracting surface including the first divisional portion, the second divisional portion and the third divisional portion and the ring-zonal diffraction section, and the ring-zonal diffraction section is provided on the refracting surface.

9. The optical pickup apparatus of claim 8,
wherein the ring-zonal diffraction section is provided also on each of the first divisional portion, the second divisional portion and the third divisional portion of the refracting surface.

10. The optical pickup apparatus of claim 1,
wherein the converging optical system has an objective lens which further has the optical axis and the refracting surface including the first divisional portion, the second divisional portion and the third divisional portion, and the ring-zonal diffraction section is provided on an optical member which is different from the objective lens.

11. The optical pickup apparatus of claim 2,
wherein an amount of change in wavelength of a light flux emitted from the first light source is ±20 nm or less.

12. An objective lens having an aspherical face for use in an optical pickup apparatus for reproducing information from one of different kinds of optical information recording medium, each having a transparent substrate in different thickness, or for recording information onto one of said different kinds of optical information recording medium, said objective lens comprising:
 (a) a ring-zonal diffraction section; and
 (b) an optical surface having a first divided surface, a second divided surface, and a third divided surface,
  wherein the third divided surface is farther from the optical axis than the first divided surface, the second divided surface is provided between the first divided surface and the third divided surface,
  wherein the objective lens is capable of converging a first light flux which passes through the first divided surface and a third light flux which passes through the third divided surface on a first information recording plane of a first optical information recording medium through a first transparent substrate of the first optical information recording medium, to reproduce information recorded in the first optical information recording medium or recording information on the first optical information recording medium, the thickness of the first transparent substrate is t1, and
  wherein the objective lens is capable of converging the first light flux and a second light flux which passes through the second divided surface on a second information recording plane of a second optical information recording medium through a second transparent substrate of the second optical information recording medium, to reproduce information recorded in the second optical information recording medium or recording information on the first optical information recording medium, the thickness of the second transparent substrate is t2 which is greater than t1.

13. The objective lens of claim 12,
wherein the ring-zonal diffraction section is provided on the surface which is different from the refracting surface.

14. The objective lens of claim 12,
wherein the ring-zonal diffraction section is provided on the mostly entire portion of the surface which is different from the refracting surface.

15. The objective lens of claim 12,
wherein the ring-zonal diffraction section is provided on the refracting surface.

16. The objective lens of claim 12,
wherein the ring-zonal diffraction section is provided also on each of the first divisional portion, the second divisional portion and the third divisional portion of the refracting surface.

17. The objective lens of claim 12,
wherein the following conditional expression is satisfied, $$0<=|A+B|<=|A|$$

wherein A represents an amount of focal point shifting caused on the refracting surface by a wavelength change of a light flux emitted from a light source, and B represents an amount of focal point shifting caused on the ring-zonal diffraction section by a wavelength change of a light flux emitted from the light source.

18. The objective lens of claim 12,
wherein the following conditional expression is satisfied, $$|A+B|=0.$$

19. An optical information recording medium reproducing or recording apparatus for reproducing information from one of different kinds of optical information recording medium, each having a transparent substrate in different thickness, or for recording information onto one of said different kinds of optical information recording medium, said optical information recording medium reproducing or recording apparatus comprising:
 an optical pickup apparatus comprising:
  (a) a light source for emitting light flux;
  (b) a converging optical system having an optical axis, a ring-zonal diffraction section, and a refracting surface including a first divisional portion, a second divisional portion and a third divisional portion,
   wherein the third divisional portion is farther from the optical axis than the first divisional portion, and the second divisional portion is provided between the first divisional portion and the third divisional portion; and
  (c) an image sensor,
   wherein the first divisional portion and the third divisional portion are capable of converging the light flux on a first information recording plane of a first optical information recording medium having a first transparent substrate of thickness t1, to reproduce information recorded in the first optical information recording medium or recording information on the first optical information recording medium,
   wherein the first divisional portion and the second divisional portion are capable of converging the light flux on a second information recording plane of a second optical information recording medium having a second transparent substrate of thickness t2, to reproduce information recorded in the second optical information recording medium or recording information on the second optical information recording medium, wherein t2 is greater than t1, and wherein the image sensor is capable of receiving light flux reflected from the first information recording plane or the second information recording plane.

20. The optical information recording medium recording and reproducing apparatus of claim 19, wherein the following conditional expression is satisfied, $0<=|A+B|<=|A|$ wherein A represents an amount of focal point shifting caused on the refracting surface by a wavelength change of a light flux emitted from the light source, and B represents an amount of focal point shifting caused on the ring-zonal diffraction section by a wavelength change of a light flux emitted from the light source.

21. The optical information recording medium recording and reproducing apparatus of claim 20, wherein the following conditional expression is satisfied, $|A+B|=0.$ 22. The optical information recording medium recording/reproducing apparatus of claim 19, wherein the converging optical system has an objective lens which further has the optical axis, the refracting surface including the first divisional portion, the second divisional portion and the third divisional portion and the ring-zonal diffraction section, and the ring-zonal diffraction section is provided on the surface of the objective lens which is opposite to the refracting surface.

23. The optical information recording medium recording and reproducing apparatus of claim 19, wherein the converging optical system has an objective lens which further has the optical axis, the refracting surface including the first divisional portion, the second divisional portion and the third divisional portion and the ring-zonal diffraction section, and the ring-zonal diffraction section is provided on the refracting surface.

24. The optical information recording medium recording and reproducing apparatus of claim 19, wherein the converging optical system has an objective lens which further has the optical axis and the refracting surface including the first divisional portion, the second divisional portion and the third divisional portion, and the ring-zonal diffraction section is provided on an optical member which is different from the objective lens.

* * * * *